United States Patent [19]
Habermehl et al.

[11] Patent Number: 5,758,768
[45] Date of Patent: Jun. 2, 1998

[54] SUPPORTING DEFLECTIVE SCREWSTRIP

[75] Inventors: G. Lyle Habermehl, 436 Calvert Dr., Gallatin, Tenn. 37066; Troy D. Hale, Hendersonville; William Stacy Kepley, Portland, both of Tenn.

[73] Assignee: G. Lyle Habermehl, Gallatin, Tenn.

[21] Appl. No.: 754,543

[22] Filed: Nov. 21, 1996

Related U.S. Application Data

[63] Continuation-in-part of Ser. No. 673,398, Jun. 28, 1996.

[51] Int. Cl.$^6$ ............................................. B65D 73/00
[52] U.S. Cl. ............................................. 206/347; 206/820
[58] Field of Search ............................ 206/338, 343–347, 206/443, 820; D25/136, 137

[56] References Cited

U.S. PATENT DOCUMENTS

| | | |
|---|---|---|
| 2,982,595 | 5/1961 | Rogers, Jr. . |
| 3,167,778 | 2/1965 | Decot et al. . |
| 3,592,339 | 7/1971 | Briggs, Jr. . |
| 3,830,364 | 8/1974 | Hedlund .................... 206/338 |
| 3,885,669 | 5/1975 | Potucek .................... 206/338 |
| 4,019,631 | 4/1977 | Lejdegard et al. .......... 206/347 |
| 4,146,071 | 3/1979 | Mueller . |
| 4,167,229 | 9/1979 | Keusch et al. . |
| 4,930,630 | 6/1990 | Habermehl ................. 206/347 |
| 5,409,111 | 4/1995 | Takumi . |
| 5,443,345 | 8/1995 | Gupta ........................ 206/347 |
| 5,542,323 | 8/1996 | Habermehl et al. ......... 206/347 |
| 5,544,746 | 8/1996 | Dohi .......................... 206/346 |
| 5,622,024 | 4/1997 | Habermehl ................. 206/338 |

FOREIGN PATENT DOCUMENTS

| | | |
|---|---|---|
| 1040600 | 10/1978 | Canada . |
| 1054982 | 5/1979 | Canada . |
| 2363974 | 8/1984 | Germany . |

*Primary Examiner*—Paul T. Sewell
*Assistant Examiner*—Luan K. Bui
*Attorney, Agent, or Firm*—Dorsey & Whitney LLP

[57] ABSTRACT

A collated screwstrip comprising a plastic holding strip and a plurality of threaded fasteners with the holding strip holding the fasteners in a row in spaced side by side relation. The holding strip comprises a web member extending axially relative the screws and between screws. A reinforcing rib is disposed centrally on a side of the web member outboard of the screws which rib has a constant cross-sectional shape and size throughout the length of the holding strip and has a height less than that of the web member.

27 Claims, 18 Drawing Sheets

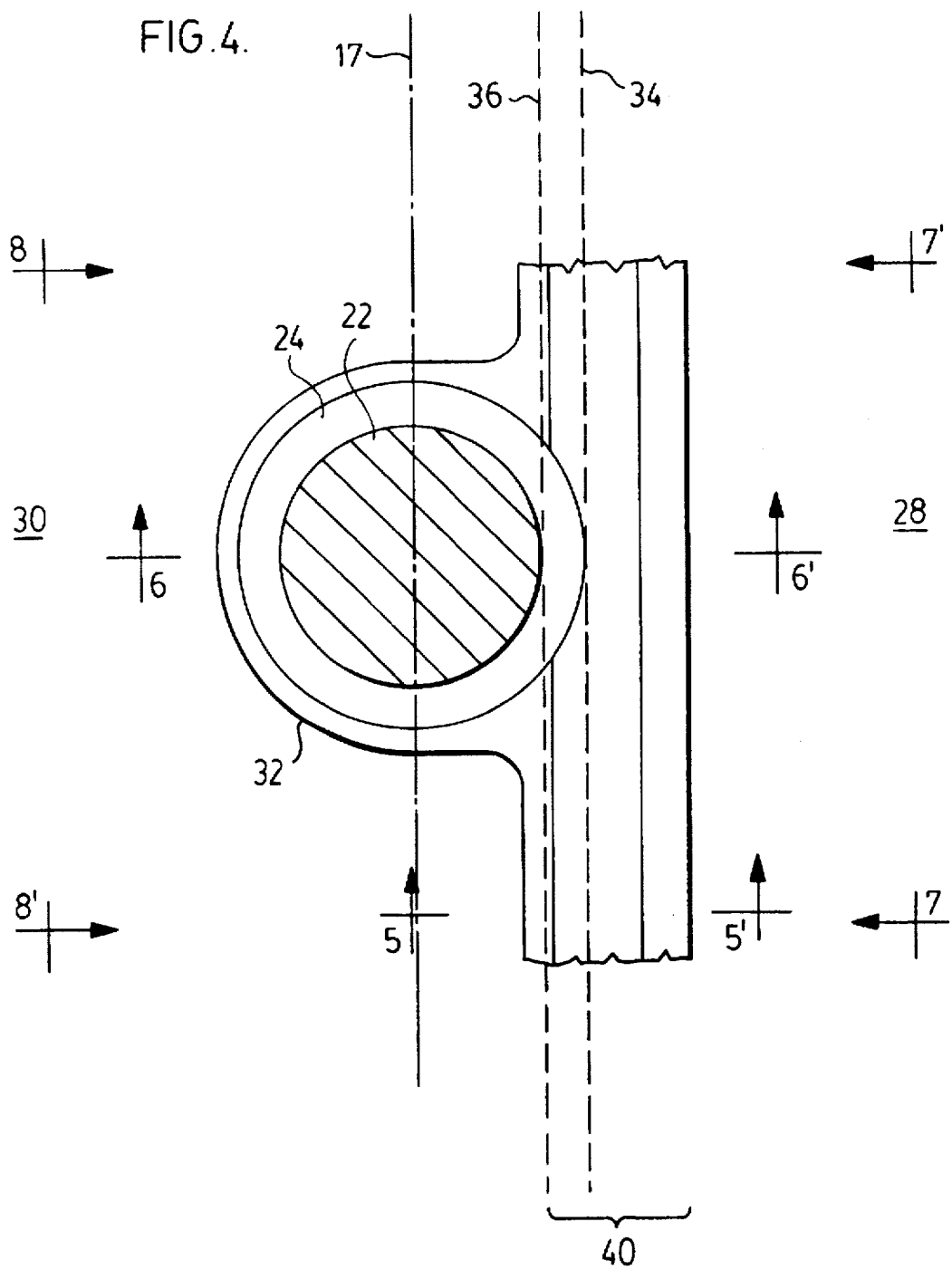

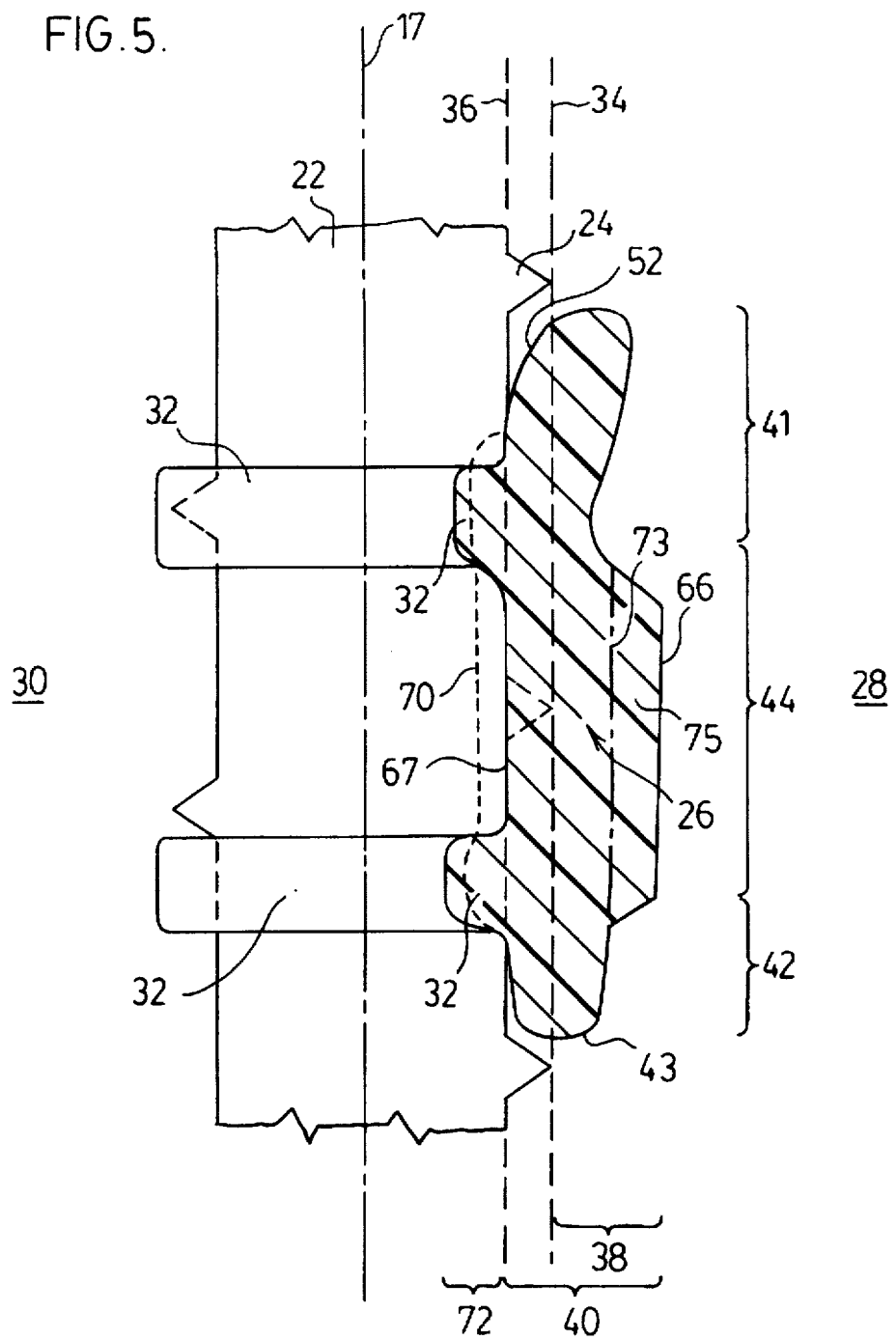

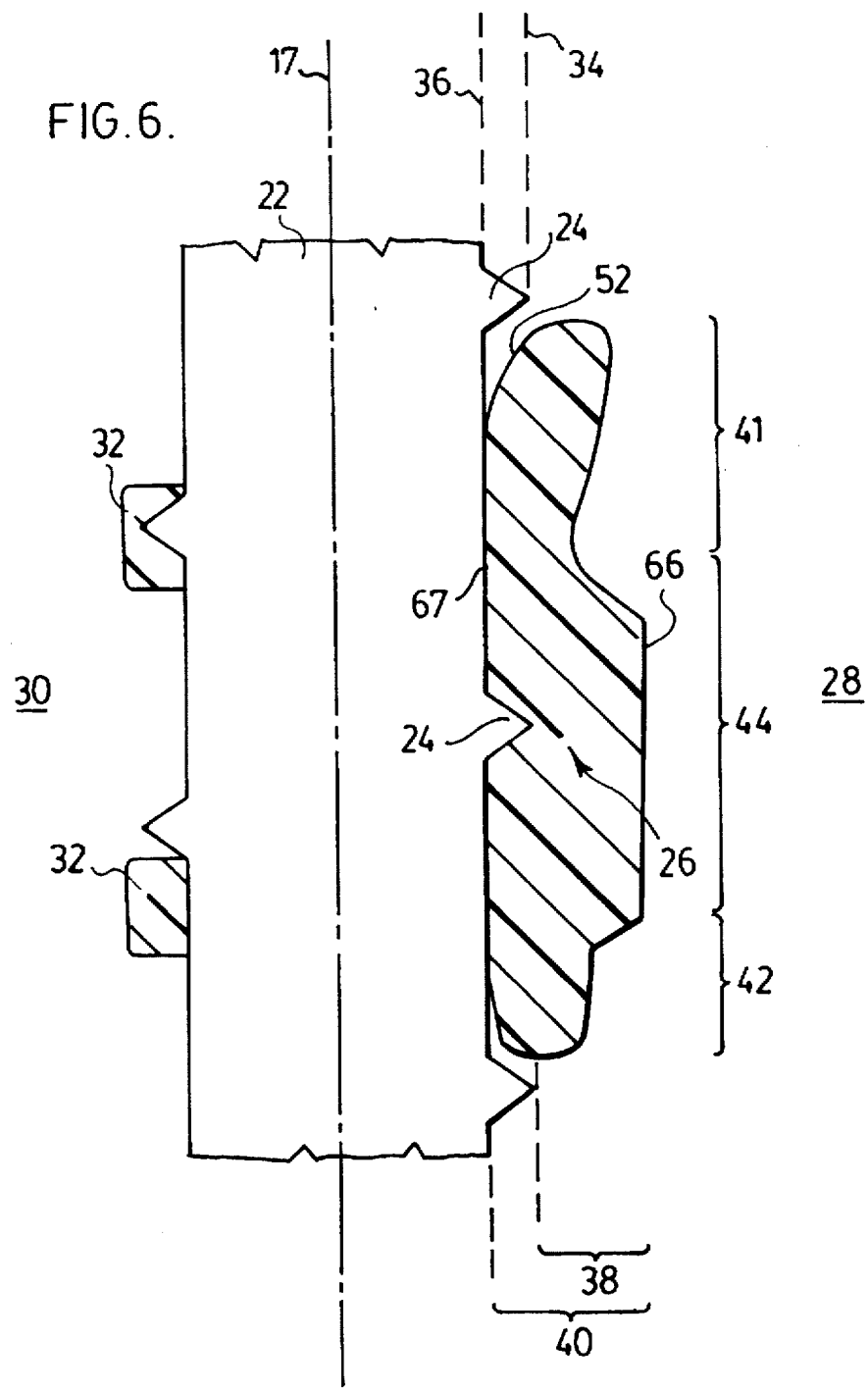

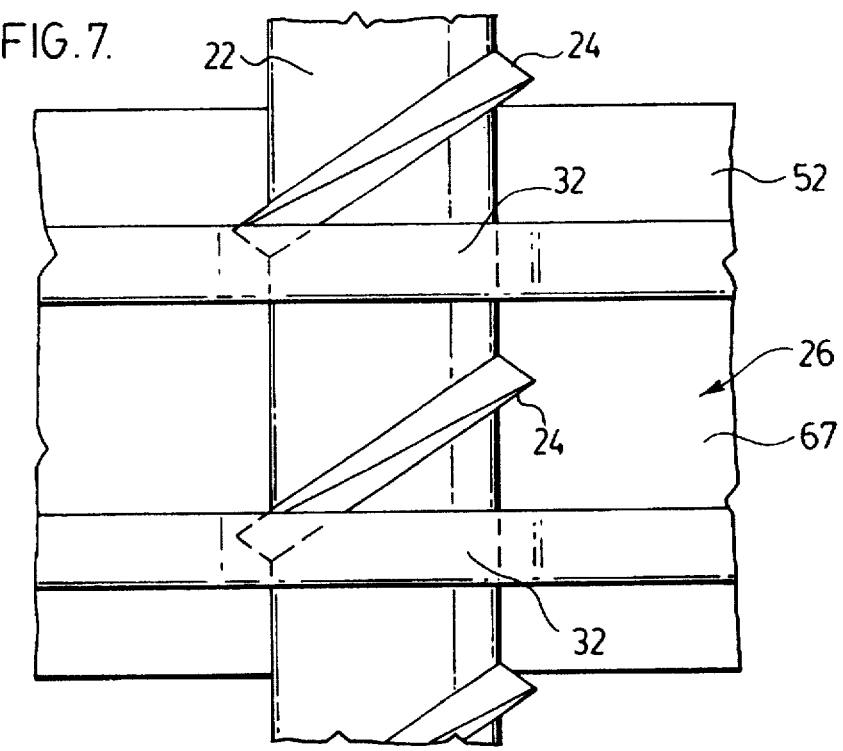
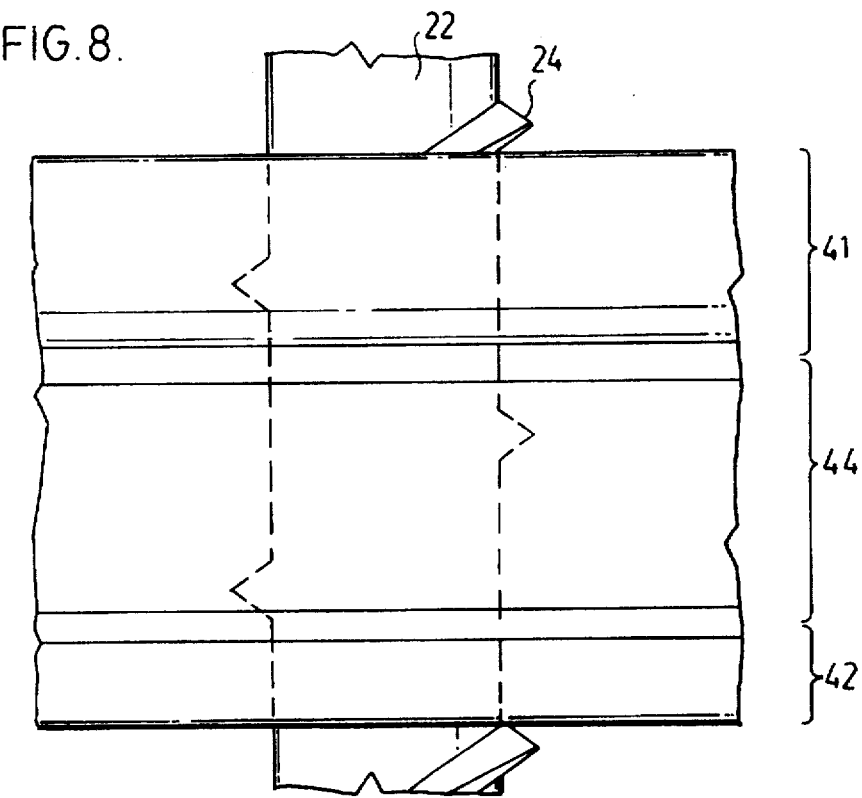

5,758,768

1

SUPPORTING DEFLECTIVE SCREWSTRIP

RELATED APPLICATIONS

This application is a continuation-in-part of U.S. patent application Ser. No. 08/673,398, filed Jun. 28, 19960 pending.

SCOPE OF THE INVENTION

This invention relates to collated screwstrips comprising a holding strip made of plastic for retaining a plurality of screws in a row and, more particularly, to a screwstrip adapted to be provided in discrete lengths and to be substantially self-supporting over its length.

BACKGROUND OF THE INVENTION

Screwstrips are known whereby the screws are connected to each other by a retaining belt of plastic material. Screws in such strips are engaged by a bit of a power screwdriver and then screwed into the workpiece. In the course of the bit engaging the screw and/or driving the same into the workpiece, the screw becomes detached from the plastic strip.

Known screwstrips of this type are disclosed in Canadian Patent 1,040,600, issued Oct. 17, 1978 to Schwartz and U.S. Pat. No. 4,167,229 to Reich et al, issued Sep. 11, 1979. These screwstrips are particularly adapted to be disposed in a helical coil containing, for example, up to 500 screws and to be placed in a canister to retain the screwstrip and from which canister the screwstrip is drawn such that the screwstrip may be advanced and each screw thereof successively driven from the holding strip as in a power driver such as described in U.S. Pat. No. 4,164,071 to Mueller et al, issued Mar. 27, 1979 and U.S. Pat. No. 5,568,753 to Habermehl, issued Oct. 29, 1996.

The present applicant has appreciated that the use of a screwstrip in a coil suffers a number of disadvantages. One disadvantage is that the coiled screwstrip represents a relatively substantial mass and weight which requires a separate canister to carry the screwstrip near the power driver. Particularly for a portable power driver, this increases the mass and weight of the power driver and renders the power driver more difficult and cumbersome to use. Another disadvantage is that the coil comprising the screwstrip is substantial in size and mass and is relatively inconvenient to change. A further disadvantage with coil screwstrips is that the spent strip from which screws have been driven frequently is relatively long and must be cut off to reduce its interference with use of the power driver. Another disadvantage with screwstrips is that tips of screws in the screwstrip leading to the screw being driven may sometimes engage and scratch the work surface.

Prior art collated screwstrips suffer the disadvantage of not having a configuration which permits the screwstrips to be sufficiently self-supporting in discrete lengths practical for use with power drivers.

SUMMARY OF THE INVENTION

To at least partially overcome disadvantages of the prior art, the present invention provides a collated screwstrip of discrete length which is substantially self-supporting yet permits sufficient flexibility to permit driving of the screw in an advantageous manner from the screwstrip.

An object of the present invention is to provide an improved configuration for a holding strip for holding screws in a collated screwstrip.

2

Another objective is to provide a holding strip for a collated screwstrip which assists in deflecting the holding strip away from the screw on the screw being driven from the screwstrip.

Another objective is to provide a screwstrip which provides positive displacement of the holding strip laterally out of the path of a screw being driven.

Another object is to provide a screwstrip which has a curved configuration with the screws disposed a constant distance from a point.

The present inventor has appreciated that advantages arise when power drivers for driving collated screws utilize collated screws which are disposed in strips of discrete length and has appreciated a need for a screwstrip of discrete length which is self-supporting. However, the inventor has appreciated that the need for discrete length screwstrips to be self-supporting is inconsistent with the need of the screwstrip to be sufficiently flexible such that when the screw is being driven from the plastic screwstrip, the plastic holding strip deflects out of the way of the head of the screw being driven and of the screwdriver bit and shaft driving the same.

Accordingly, in accordance with one aspect of this invention, the present invention provides a collated screwstrip comprising a plastic holding strip and a plurality of threaded fasteners;

each fastener disposed about an axis and having a head at an upper end, a tip extending from the other lower end and a shank extending from below the head to the tip about the axis, threads about the shank, the holding strip holding the fasteners in a row in spaced side-by-side relation with the axis of the fasteners in a common plane;

the holding strip comprising an elongate beam member on one, outboard side of the common plane and with, for each fastener, at least one fragile strap member bridging the beam member across the shank of its respective fastener and passing on the other inboard side of the common plane to retain the fastener on the beam member, the beam member including an uppermost portion closest the head of the fastener and an enlarged reinforcing portion closer to the tip than the uppermost portion;

an outboardmost surface of the beam member having substantially the same profile in any cross-section normal the common plane throughout the length of the beam member;

in any cross-section normal the common plane the reinforcing portion having a width normal the common plane greater than a width of the uppermost portion normal the common plane such that the outboardmost surface of the beam member on the reinforcing portion extends farther outboard from the common plane than outboardmost surface of the beam member on the uppermost portion.

In another aspect, the present invention provides a collated screwstrip comprising a plastic holding strip and a plurality of threaded fasteners;

each fastener disposed about an axis and having a head at an upper end, a tip extending from the other lower end and a shank extending from below the head to the tip about the axis, threads about the shank, the holding strip holding the fasteners in a row in spaced side-by-side relation with the axis of the fasteners in a common plane;

the holding strip comprising a web member substantially on one outboard side of the common plane extending axially relative the screws and between the screws with a sleeve member about the screw retaining the screw, the web member generally elongated in height measured parallel the axis of the screws as compared to its width normal the common plane, a reinforcing rib disposed generally centrally on an outboard side of the web having substantially the same cross-sectional shape and size in any cross-section normal the common plane throughout the length of the holding strip, the rib having a height measured parallel the axes of the screws less than the height of the web.

In a further aspect, the present invention provides a screwstrip comprising a holding strip and a plurality of fasteners, each fastener disposed about an axis and having a head and an upper end, a tip extending from the other end and a shank extending from below the head to the tip about the axis, the holding strip holding the fasteners in a row spaced side-by-side relation with the axis of the fasteners in a common plane, the holding strip comprises an elongate beam member which extends axially relative the screws and longitudinally between screws, at least a portion of the holding strip holding the fasteners in a generally curved configuration wherein the heads of the screws lie on a curve in the common plane and the tips of the screws lie in a corresponding curve but of greater radii.

BRIEF DESCRIPTION OF THE DRAWINGS

Further aspects and advantages of the present invention will become apparent from the following description taken together with the accompanying drawings in which:

FIG. 4 is a cross-sectional bottom view of one screw in the screwstrip of FIG. 2 along line 4-4';

FIG. 5 is a cross-sectional end elevation view of the strip of FIG. 4 along line 5-5' between two screws;

FIG. 6 is a cross-sectional end elevation view of the strip of FIG. 4 along line 6-6' centrally through a screw;

FIG. 7 is a front elevational view of one of the screws of the screwstrip of FIG. 1 as from view line 7-7' in FIG. 4;

FIG. 8 is a rear elevational view of one of the screws in the screwstrip of FIG. 1 as from view line 8-8' in FIG. 4;

DETAILED DESCRIPTION OF THE DRAWINGS

Figure 1:
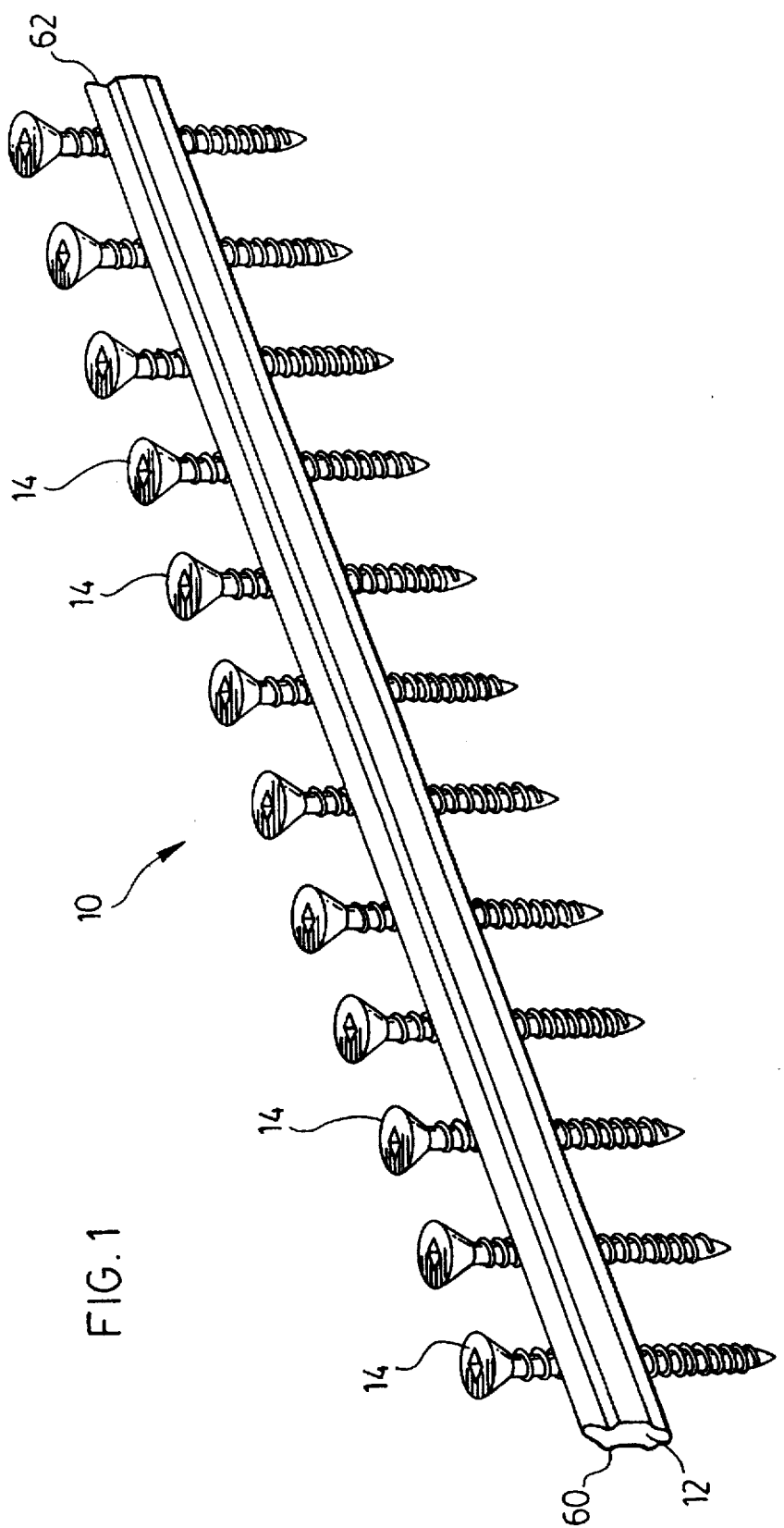
FIG. 1 shows a pictorial front view of a complete screwstrip in accordance with the first embodiment of the present invention.
Figure 2:
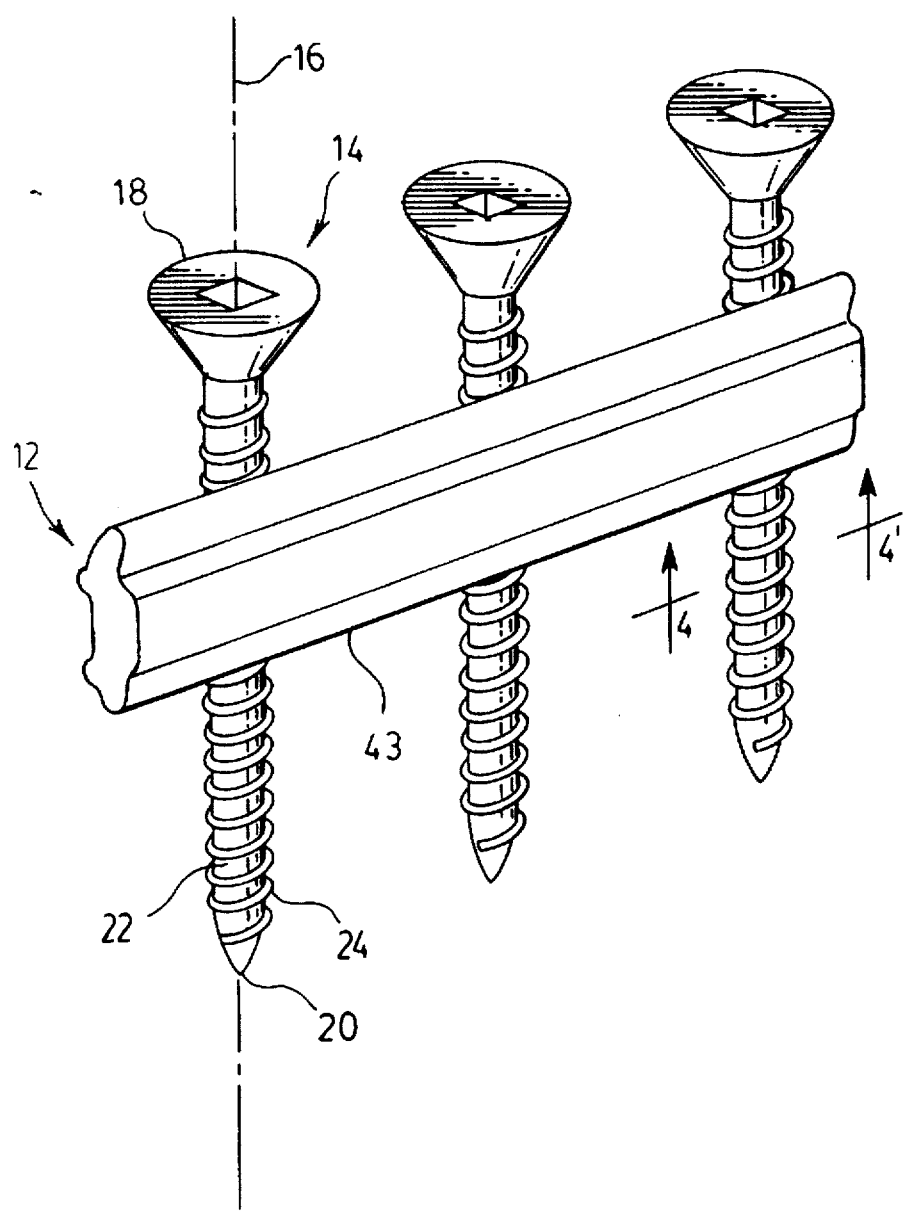
FIG. 2 is an enlarged pictorial front view of a segment of the screwstrip of FIG. 1.
Figure 3:
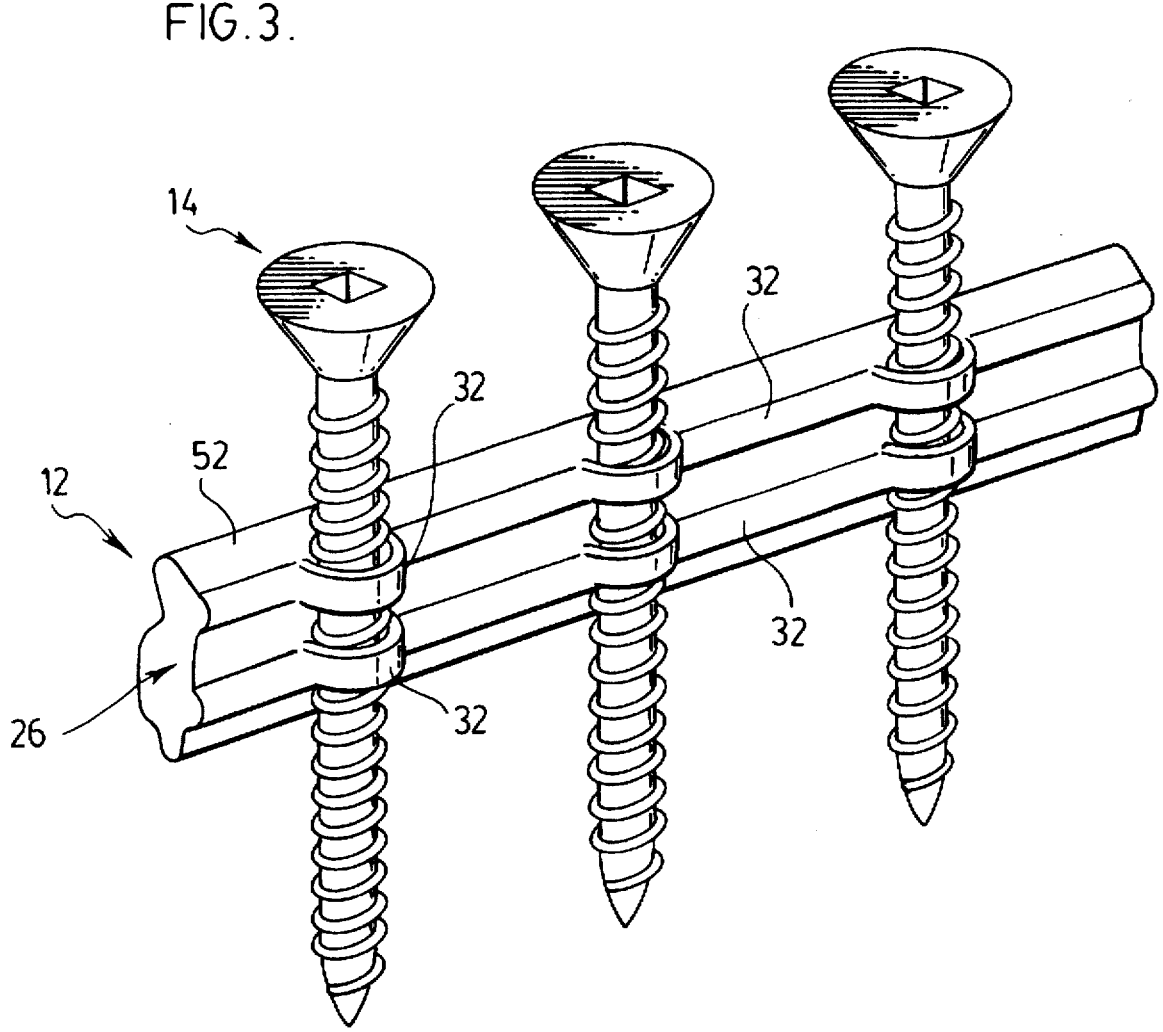
FIG. 3 is an enlarged pictorial rear view of a segment of the screwstrip in FIG. 1.

Reference is made to FIGS. 1 to 3 which shows a collated screwstrip in accordance with the present invention generally indicated 10 and comprising a holding strip 12 carrying a plurality of screws 14. The holding strip 12 comprises an elongate thin band of plastic, preferably thermoplastic material. The screwstrip 10 of FIG. 1 comprises a complete screwstrip of discrete length carrying twelve screws.

Each screw 14 is disposed about an axial central axis 16 and has a head 18 at an upper end, a tip 20 extending from the other lower end and a shank 22 extending from the head to the tip about the axis 16. The shank 22 carries threads 24.

The screws 14 are carried on the holding strip 12 evenly spaced from one another. In the embodiment shown in FIG. 1, while not necessary, the axis 16 of each screw is parallel the axis of each other screw. The axis 16 of all the screws lies in a common plane indicated as 17 in FIGS. 4, 5 and 6 which is planar and extends centrally through each screw.

The holding strip 12 comprises an elongate beam member 26 which is disposed on one side of the common plane, which side is referred to herein as the outboard side. The other side is referred to herein as the inboard side. The outboard side is designated by numeral 28 in FIGS. 4, 5 and 6 and the inboard side is designated by numeral 30.

For each screw 14, two fragile strap members 32 are provided to secure the screw to the beam member 26. The straps 32 bridge the beam member 26 across the shank 22 so as to extend from the beam member 26 to pass around the shank 22 on the inboard side 30 of the shank.

FIG. 4 shows a cross-sectional view normal to the axis of a screw 14, and clearly shows the shank 22 as being generally circular in cross-section with the threads 24 schematically shown in cross-section appearing as a circular ring coaxially thereabout.

Each strap 32 is sized so as to extend radially from the shank 22 beyond the radial extent of the threads such that where a strap 32 traverses a thread 24, the strap 32 is not severed.

As shown, the threads 24 on the outboard side of each screw 14 are engaged in grooves in an inboard surface 67 of the beam member 26.

The beam member 26 has an outboardmost surface 66 which extends the full height of the beam member. This outboardmost surface 66 defines a profile as seen in cross-sectional view normal the common plane which is substantially the same in any cross-section normal the common plane at any point along the entire length of the beam member 26. Thus as seen in the cross-section of FIG. 5 which is intermediate two screws and in the cross-section of FIG. 6 which is through a screw, the profile of outboardmost surface 66 is substantially identical.

In FIGS. 4, 5 and 6, a first dashed line is shown as 34 which represents a plane 34 parallel the common plane 17 representing the farthest extension of the threads 24 away from the common plane. A second dashed line is shown as 36 which represents in a plane parallel the common plane 17 the farthest extension of the shank 22 away from the common plane.

As may be seen having regard to FIGS. 4, 5 and 6, the beam member includes an outboardmost beam segment 40 which extends inwardly from the profile of outboardmost surface 66 to plane 36 of substantially constant cross-section in a plane normal the common plane along the entire length of the holding strip. This outboardmost beam segment 40 is outboard of plane 36 and is of the same constant size and shape in cross-section in FIG. 5 (when the cross-section is intermediate two screws 14 along section line 5–5' in FIG. 4) as in FIG. 6 (when the cross-section is through the axis 16 of a screw 14 along section line 6–6' in FIG. 4). In referring to the cross-sectional size and shape of the outboardmost segment 40 through a screw as in FIG. 6, the extension of threads into the beam member is to be ignored.

As seen in FIGS. 4 and 5, the beam member 26 does not extend inboard towards the common plane 17 beyond plane 36. The beam member 26 is preferably extruded from one nozzle as a unitary member which is disposed on the outboard side of the shank 22 of each screw. The straps 32 are also preferably extruded from two other nozzles as thin elongate members which pass over each screw on the inboard side of the shank 22 and which become secured to the inboard surface 67 of the beam member 26 as two elongate rib-like members integral with the beam member 26.

As may also be seen having regard to FIGS. 4, 5 and 6, another segment 38 of the beam member outboard of plane 34 is also of substantially constant cross-section in a plane normal the common plane for the entire length of the screwstrips.

The beam member 26 is provided to have three portions, namely, an uppermost portion 41 closest to the head of the screw, a lowermost portion 42 closest the tip of the screw and an enlarged reinforcing central portion 44 between the uppermost portion and the lowermost portion. The central portion 44 is of a greater width than the uppermost portion 41 or the lowermost portion 42. Thus, as seen, the central portion 44 extends farther from the central plane 17 than either the uppermost portion 41 or the lowermost portion 42. The central portion 44 extends outboard from the common plane 17 substantially a constant distance over its height to present the outboard surface 66 over the central portion 44 in an outboard plane parallel the common plane. With the central portion of a greater width, the three portions roughly define a generally T-shape, however, rather flattened and turned on its side.

In the preferred configuration as best illustrated in FIG. 5, the beam member 26 excluding the straps 32 from consideration does not extend toward the common plane 17 beyond the plane 36. However, it is within the scope of this invention that in between the screws the beam member extend towards the common plane 17 beyond the plane 36 and have, for example, its inboard surface and straps 32 located as indicated by the dotted line 70. The segment of the beam member 26 inboard of plane 36 is referred to as the inboard beam segment 72. The inboard beam segment 72 when existing typically does not extend parallel to the common plane between two screws but rather has a greater width proximate each screw than between screws. The inboard beam segment 72 preferably is on the outboard side of the common plane 17 and more preferably does not extend towards the common plane 17 past the plane 36 in a direction normal the common plane more than about one-half of a radius of the shank 22 of the screw. Preferably, in any cross-section normal the common plane the area represented by the inboard beam segment 72 and the straps 32 does not exceed about 50% of the area in that cross-section of the beam segment 40, more preferably does not exceed about 25% and even more preferably does not exceed about 10%. Preferred ranges for a percentage of the area of inboard beam segment 72 including the straps 32 to the area of the outboardmost beam segment 40 is about 50% to 0%. However, with the configuration of FIG. 5 in solid lines, the area of the straps inboard of line 36 may be in the range of 5 to 15%.

While not necessary, the straps 32 are shown advantageously joined to the beam member 26 with an uppermost strap proximate the juncture between the uppermost portion 41 and the central potion 44 and a lowermost strap proximate the juncture between the central portion 44 and the lowermost portion 42.

In another preferred configuration which is not shown, the area of the straps 32 inboard of the line 36 in between screws is to be approximately zero as by forming the extruded material to form the straps 32 about the screws to merge into the beam member 26 and together be disposed outboard of line 36.

In the high speed manufacture of the screwstrip by conventional methods utilizing thermoplastic materials for the holding strip, it is difficult to precisely constrain the holding strip to desired configurations and typically to some extent an inboard beam segment 72 will result in addition to the straps 30 inboard of line 36.

Figure 9:
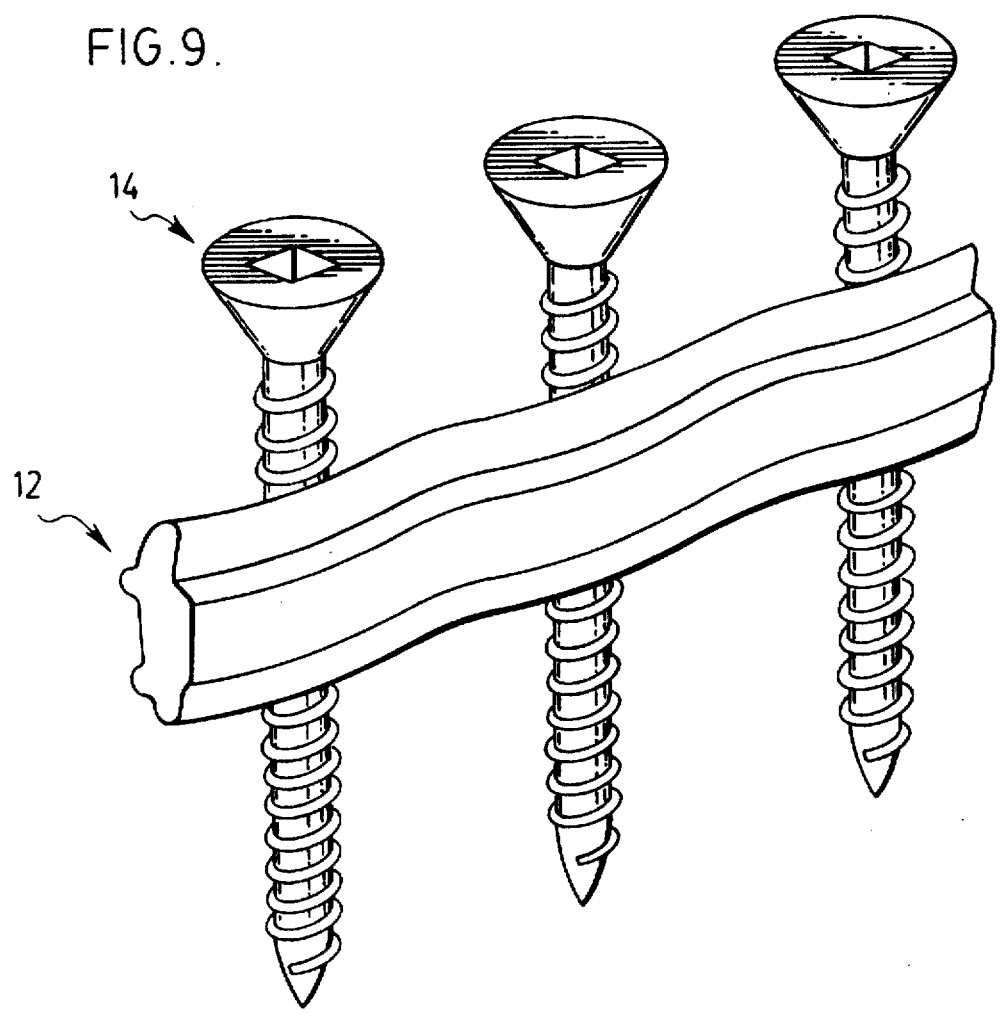
FIG. 9 is an enlarged pictorial front view of a segment of a screwstrip in accordance with a second embodiment of the present invention.
Figure 10:
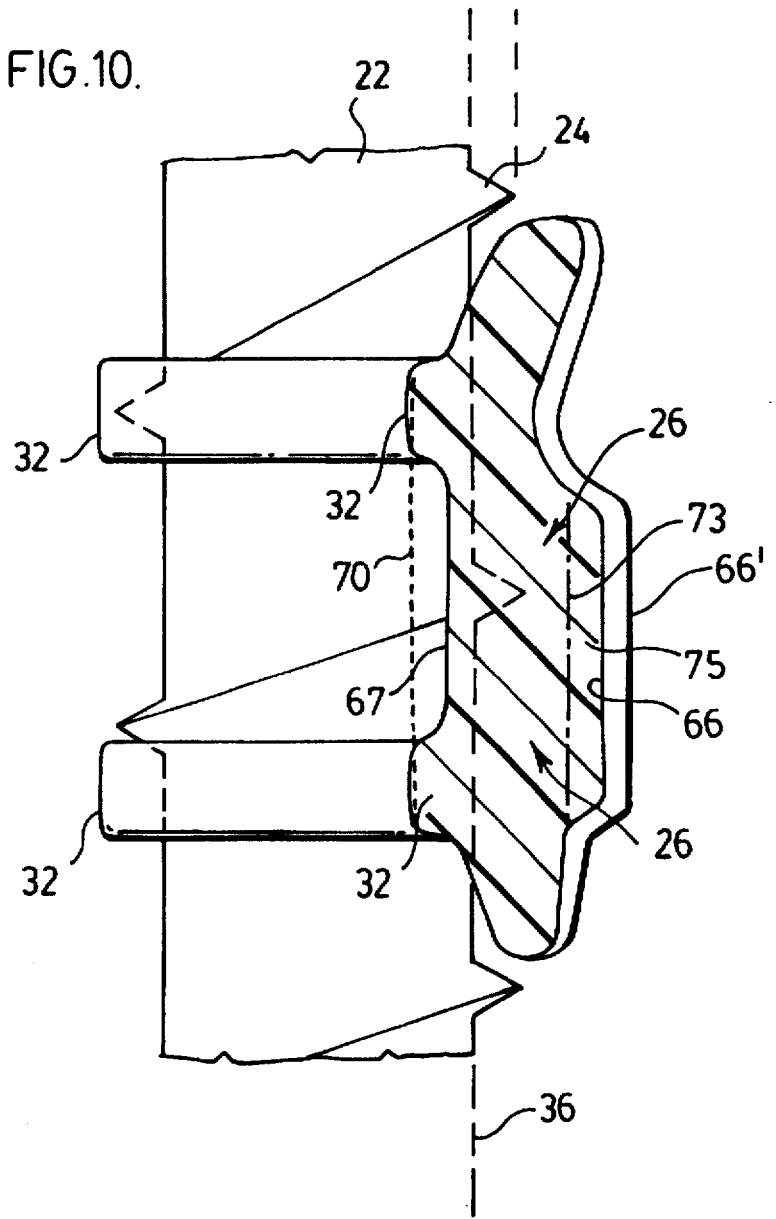
FIG. 10 is a cross-sectional end elevation view of the strip of FIG. 9 between two screws.
Figure 11:
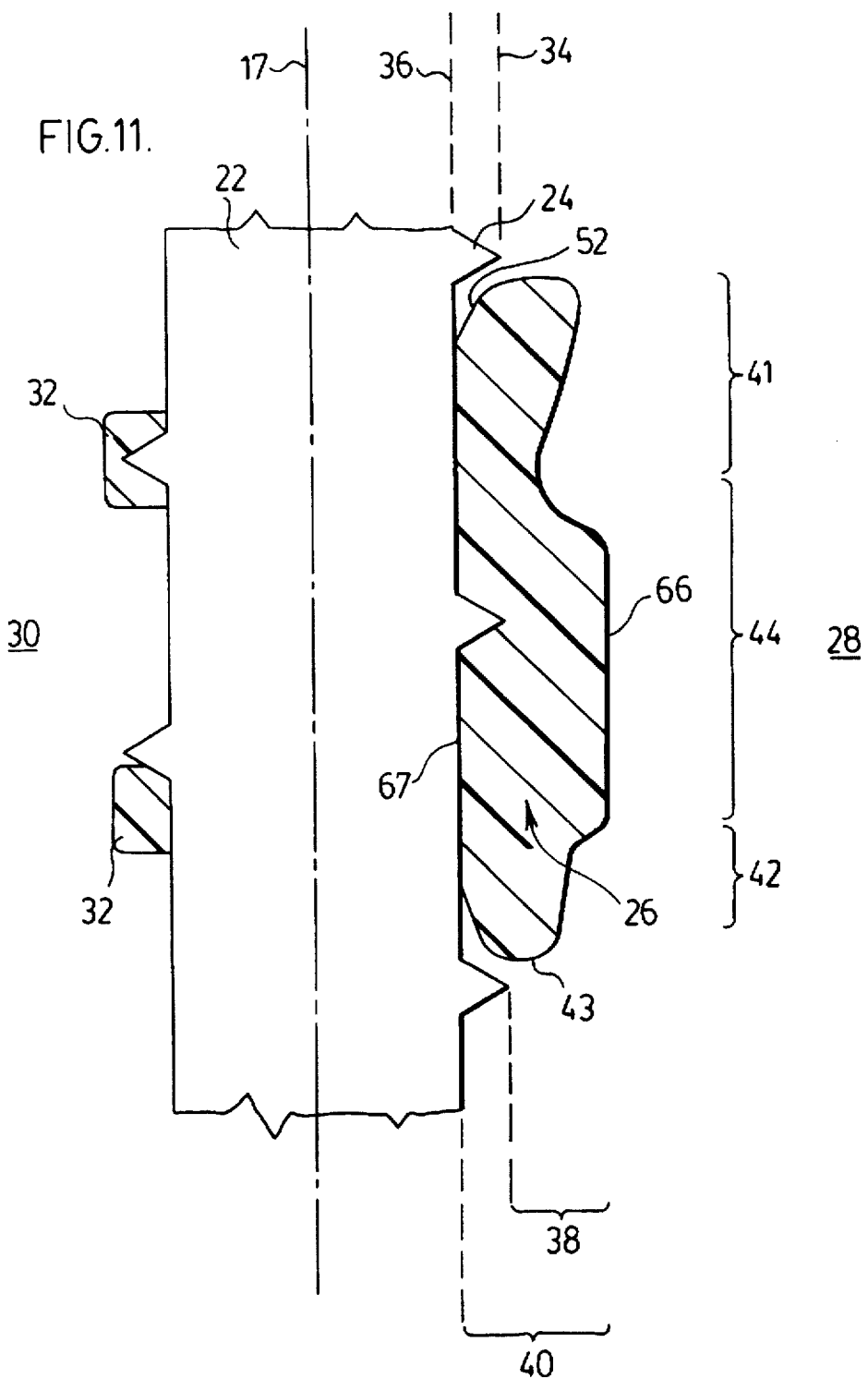
FIG. 11 is a cross-sectional end elevation view of the strip of FIG. 9 through a screw.

The screwstrip 10 shown in FIGS. 1 to 8 has been shown with the holding strip 14 having straight lines as seen in FIG. 1 depicting for example edges of the profile of the outboardmost surface 66 of the beam member 26. FIGS. 9, 10 and 11 are representations of a second embodiment of a screwstrip in accordance with the invention however in which the outboardmost surface 66 of the beam member 26 varies in distance from the common plane 17 with this distance being greatest at cross-sections through each screw and least at cross-sections intermediate two screws. In FIGS. 9, 10 and 11, the same reference numbers are used to indicate corresponding elements as in FIGS. 1 to 8.

FIG. 10 is a cross-sectional end view through the screwstrip of FIG. 9 in between screws. FIG. 11 is a cross-sectional end view through the screwstrip of FIG. 9 through a screw. FIGS. 10 and 11 show that the extent to which the outboardmost surface 66 of the beam member 26 is spaced outboard of the common plane 17 is greatest at each screw. The outboardmost surface 66 of the central portion 44 has a relative minimum outward extent from the common plane 17 as shown in hatched cross-section in FIG. 10 at the cross-section in between two screws. The outboardmost surface 66 of the central portion has a relative maximum outward extent relative the common plane 17 at each screw as shown in hatched cross-section in FIG. 11 at the cross-section through a screw and as is indicated in solid outline as 66' in FIG. 10. The distance of the outboardmost surface 66 from the common plane varies in a generally sinusoidal curving manner between screws along the length of the holding strip. Despite the sinusoidal variances of the relative location of the outboardmost surface 66, this surface defines a profile as seen in cross-sectional view normal the common plane which is substantially the same in any cross-section normal the common plane at any point along the entire length of the beam member 26. As well, despite the sinusoidal variances of the relative location of the outboardmost surface 66, the beam member of FIGS. 9 to 11 has an outboardmost beam segment 40 which extends towards the common plane from outboardmost surface 66 and has a cross-section of substantially the same size and shape in any cross-section normal the common plane at any point along the entire length of the holding strip.

As seen in FIG. 10, in between screws the beam member 26 and its beam segment 40 does extend inboard towards the common plane 17 beyond plane 36. Preferably as illustrated in FIG. 10, aside from the inboard extending ribs representing the straps 32 where they overly the inboard surface 67 of the beam member 26 and merge with the beam member, the beam member 26 extends inwardly beyond plane 36 a distance substantially the same as the distance the outboardmost surface 66 in the cross-section between the screws is displaced toward the common plane 17 compared to the location of the outboardmost surface in the cross-section through a screw as shown as 66' in FIG. 10.

In the embodiments of both FIGS. 1 to 8 and 9 to 11, the beam member 26 carries on the lowermost portion 42 a lowermost strip supporting surface 43 disposed at a constant height measured parallel the axis of a screw from the head of each fastener.

To a large measure the nature of the method used to manufacture the screwstrip may determine the extent to which the purely linear configuration of FIG. 1 arises as contrasted with other configurations such as the marginally sinusoidally curving configuration shown in FIGS. 9 to 11. Preferred high speed manufacture, particularly when forming the holding strip between two forming rollers journalled for rotation about axes parallel the axes of the screws may tend to provide the sinusoidally curving configuration of FIG. 9. In both the screwstrip of FIG. 1 and that of FIG. 9, the beam member 26 and particularly its beam segment 40 extends continuously along the length of the screw strip with a substantially constant cross-sectional shape.

As was the case with FIG. 5, FIG. 10 illustrates in a dotted line 70 an alternate location for the inboard surface 67 including the straps 32 which location is inboard from the location shown in solid lines and with an inboard beam segment 72 inboard of the solid line 67 and preferably limited in relation to its location relative common plane 17 and its area relative the areas of the outboardmost beam segment 40 and the straps 32 as described with reference to FIG. 5.

Figure 12:
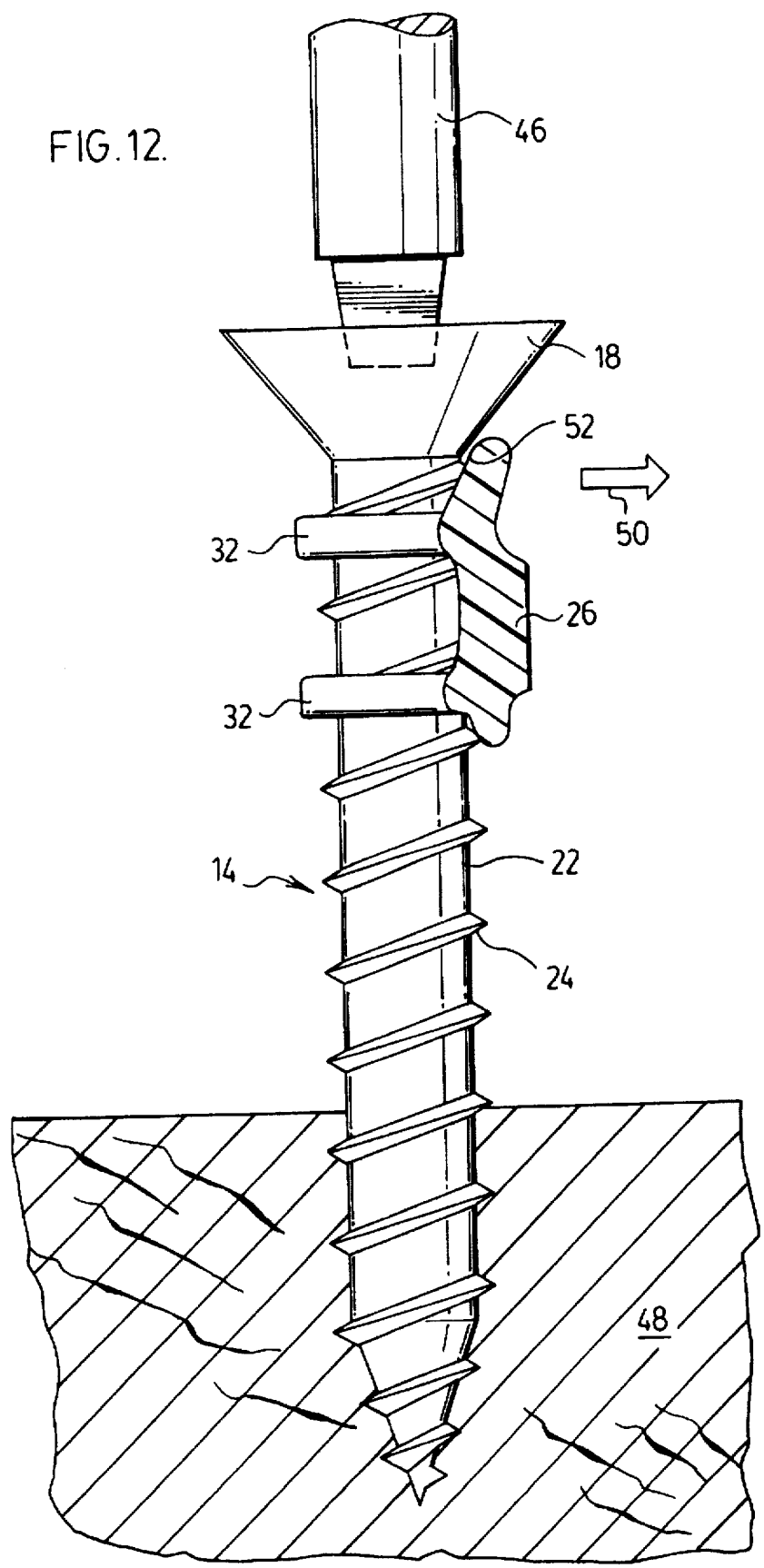
FIG. 12 is a partially cross-sectional end elevation view schematically showing the strip of FIG. 1 with a screw engaged by a screwdriver and being driven into a workpiece.

Use of a screwstrip of this invention is schematically illustrated with reference to FIG. 12 having regard to the known manner in which known screwstrips are driven by known power drivers such as that taught by U.S. Pat. No. 4,164,071 to Mueller et al.

In use, a screw 14 in the holding strip 16 is fed into a position in axial alignment with a reciprocating and rotating screwdriver bit 46 with the bridge member 26 of the holding strip held against movement towards a workpiece 48, the screwdriver bit 46 engages the head 18 of the screw 14 and rotates the screw driving it forwardly into the workpiece. By reason of the threads 24 on the shank 22 being threadably engaged with the holding strip, the screw on rotation is driven downwardly relative the holding strip with the holding strip in effect serving to guide the screw into initial engagement with the workpiece. Further rotation of screw 14 engaged in both the workpiece and the holding strip draws the screw down into the workpiece until the head 18 of the screw engages the beam member 26 of the holding strip. With further rotation of the screw with the beam member 26 held against movement towards the workpiece, the head 18 of the screw passes through the holding strip rupturing the fragile straps 32 yet leaving the beam member 26 as a continuous length. Thereafter, the screw is driven fully into the workpiece. FIG. 12 illustrates the screwstrip in use at a time when the head 18 of the screw has been engaged with the beam member 26 and the head is commencing to exert downward pressure on the beam member. Since the screw is captured between the workpiece and the screwdriver bit 46, for the screw to move past the holding strip, the straps 32 must be broken and the beam member 26 must deflect away from the screw head in a direction normal the central plane as indicated by arrow 50.

The holding strip in accordance with this invention has been configured to increase the likelihood that on the head 18 of the screw engaging the holding strip, the holding strip will be deflected radially way from the screw without the undersurface of the head 18 catching on the holding strip. As seen, the beam member 26 includes on the inboard side of the uppermost portion 41 a camming surface 52 which is disposed at an angle to the axis of the screw. The camming surface 52 angles upwardly and away from the shank 22 of the screw. Engagement between the camming surface 52 and the undersurface of the head 18 urges the holding strip away from the screw and assists in rupturing the straps 32. As well, initial engagement of the camming surface 52 will tend to pivot the beam member clockwise about the upper strap 32 as seen in FIG. 9 thus twisting the beam member about a longitudinal axis. The camming surface 52 preferably forms an acute angle with the axis 16 of the screws, with the angle being preferable in the range of about 30° to 60°.

The lateral deflection and twisting of the holding strip out from under the head is assisted by providing the beam member 26 and its beam segment 40 as a continuous segment along the length of the holding strip which requires movement in effect laterally as an integral unit.

The provision of the beam member 26 of substantially uniform cross-section along the length of the screw strip is advantageous such that the beam member provides substantially uniform strength along its length. With the beam member of the present invention, the difficulty of having the holding strip totally sever at its weakest location where a screw is received is reduced. With the outboardmost beam segment 40 being of constant shape and size throughout its length and with the inboard beam segment 72 being relatively small or non-existent, the beam member 26 has relatively constant strength throughout its length and is less prone to deflect or break at any one point. Rather, the beam member 26 is adapted to transfer and bear vertical loading along its length.

Providing the uppermost portion 41 of the beam member to be of a lesser width than the reinforcing portion 44 assists the beam member 26 to deflect out of the way of the head of a screw being driven and particularly to assist in twisting of the beam member about its longitudinal axis. Thus, as contrasted with a beam of more rectangular cross-section, the provision of the lesser width uppermost portion 41, assists in imitation of twisting of the beam and lateral deflection out from under the head of a screw being driven. The provision of a lowermost portion 42 also of reduced width further assists the beam in being able to twist and deflect laterally. With the beam member having an ability to twist and deflect, it is less likely the beam member will tear and it is less likely the beam member will collapse under axially applied forces which would result in jamming in a power driver.

Provision of the reinforcing portion 44 of the beam of greater width than the uppermost portion 41 is advantageous to prevent tearing and/or collapse of the beam when a screw is being driven from the screwstrip. To the extent that in use, the uppermost portion 41 may have a tendency to be torn as at the location of a screw being driven, having the reinforcing portion 44 of increased width, and particularly with the width increasing abruptly as a step or shoulder as shown in FIGS. 1, 9, 13 and 14 is particularly advantageous to stop any tear which might be occurring from extending from the uppermost portion 41 down into or through the reinforcing portion 44.

Similarly, to the extent that in use, the lowermost portion 42 may have a tendency to be torn as at the location of a screw being driven, having the reinforcing portion of increased width and particularly with the width increasing abruptly as a step or shoulder is advantageous to stop any tear which might be occurring from extending from the lowermost portion 42 up into or through the reinforcing portion 44.

The enlarged reinforcing portion 44, particularly when having a substantial axial extent, assists in providing lateral stability to the screwstrip. By the combination of a beam member of substantially constant cross-section outboard of the shanks of the screws and with a reinforcing portion 44 of greater width than an uppermost portion 41, a screw strip is provided which can twist and deflect to have increased resistance to severing and to have increased resistance to axially collapsing yet which provides sufficient strength to support the screwstrip holding screws fixed as is necessary for feeding o screws in power driver apparatus.

Preferably, the reinforcing portion 44 has a height measured parallel the axis of a screw which is greater than the height of either of the uppermost portion 41 or the lowermost portion 42 measured parallel the axis of the screws. The beam segment 40 preferably has a height greater than its width. Preferably, the beam member 26 and its beam segment 40 each have a height at least about twice their respective width. Preferably, the height of the reinforcing portion 44 is about one-half the height of the beam member 26 or its beam segment 40. Preferably, the height of the uppermost portion 41 is greater than the height of the lowermost portion 42.

The screwstrip of the present invention is configured as a screwstrip of discrete length and is particularly adapted to be self supporting in the sense that if the beam member 26 of the screwstrip is held at one end in a cantilevered fashion with the common plane vertical then the beam member has an appropriate size and configuration that having regard to the size and weight of the fasteners being held that the beam member supports the entire length without any undue or preferably any substantial vertical deflection. Of course, in selecting the size and configuration of the beam member, regard must be had to the nature of the plastic material or materials used for the beam member, typical temperature conditions for use and acceptable deflection having regard to power drivers to be used and intended usage. Many power drivers provide for the first two or three screws in a strewstrip to be supported in a guideway to the power driver. With many known power drivers it has been found that at room temperatures for typical wood or drywall screws, with a 12 inch strip with ⅛ inch centered screws and supporting the strip with its common plane vertical cantilevered by holding horizontal merely three screws at one end of the strip a vertical deflection downward of the other end of the strip by up to 1.5 inches, more preferably 1 inch or less is acceptable.

In FIGS. 5 and 10, a dashed and dotted line 73 differentiates what may be characterized as a reinforcing rib 75 from the remainder of the holding strip. The remainder of the holding strip may be characterized as a web which extends axially relative the screws and between the screws. The web is elongated in height measured parallel the axis of the screws as contrasted with its width measured normal the common plane. The web carries sleeves formed by the straps and partially outboard into the web to receive the screws and lands joining the sleeves, which lands may have a varying width between sleeves. The reinforcing rib 75 is also elongated in height as contrasted with its width. The height of the rib 75 is less than the height of the web. The rib is disposed relative centrally on the outboard side of the web with the rib 75 having relatively constant cross-sectional shape and size normal the common plane throughout its length across the outboard side of the web and both the sleeves and the lands. The rib 75 serves to reinforce and strengthen the web by providing increased width to the holding strip over the center of the web. While the rib 75 reinforces the web over its center, the web retains a resiliency and flexibility over its uppermost portion and lowermost portion which extends axially beyond the rib.

The web preferably comprises principally the outboard portion other than the rib 75 with any outboard portion representing a smaller proportion of the web than the outboard portion. Preferably, the rib comprises in the range of about 25% to 50% of the cross-sectional area of the outboard portion, more preferably, about one-third the cross-sectional area of the outboard portion.

The rib 75 preferably has a height of about one-half of the height of the web.

Figure 13:
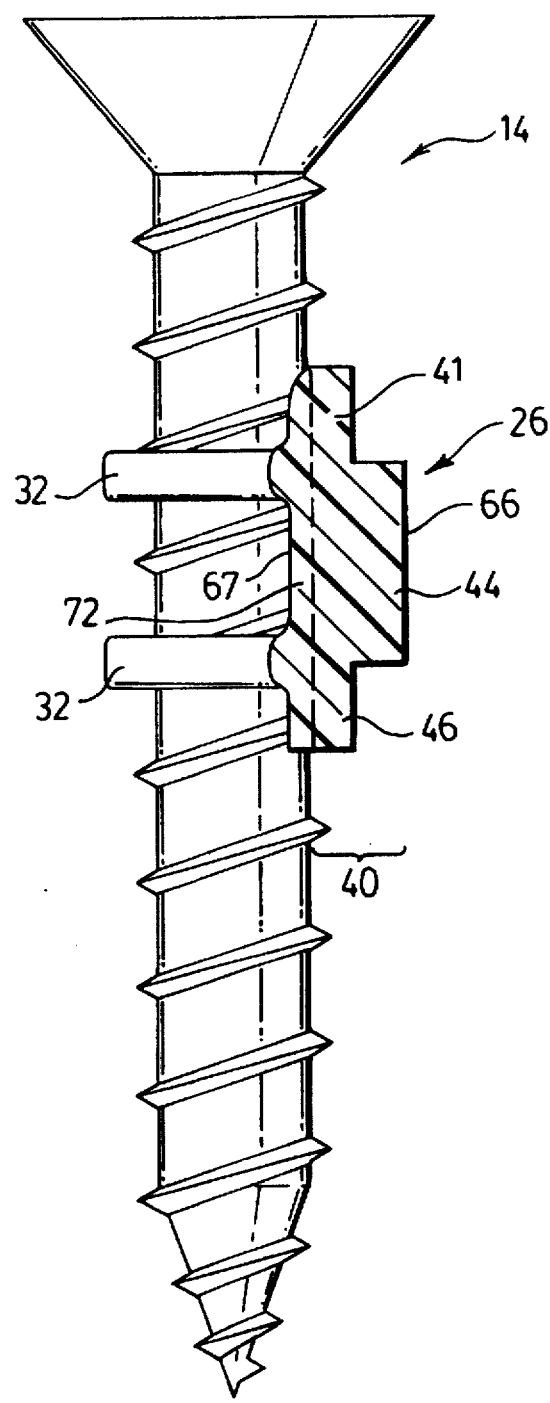
FIGS. 13, 14 and 15 each is a cross-sectional end elevation view centrally through a screw in a screwstrip in accordance with third, fourth, and fifth embodiment respectively of the present invention.
Figure 14:
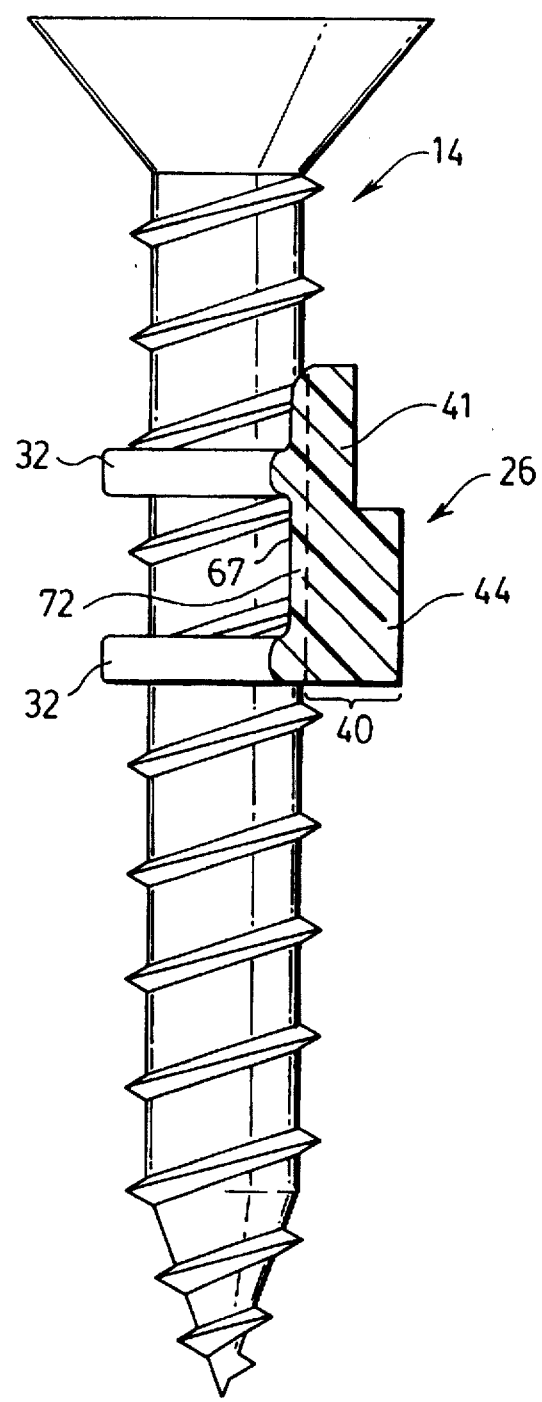
Figure 15:
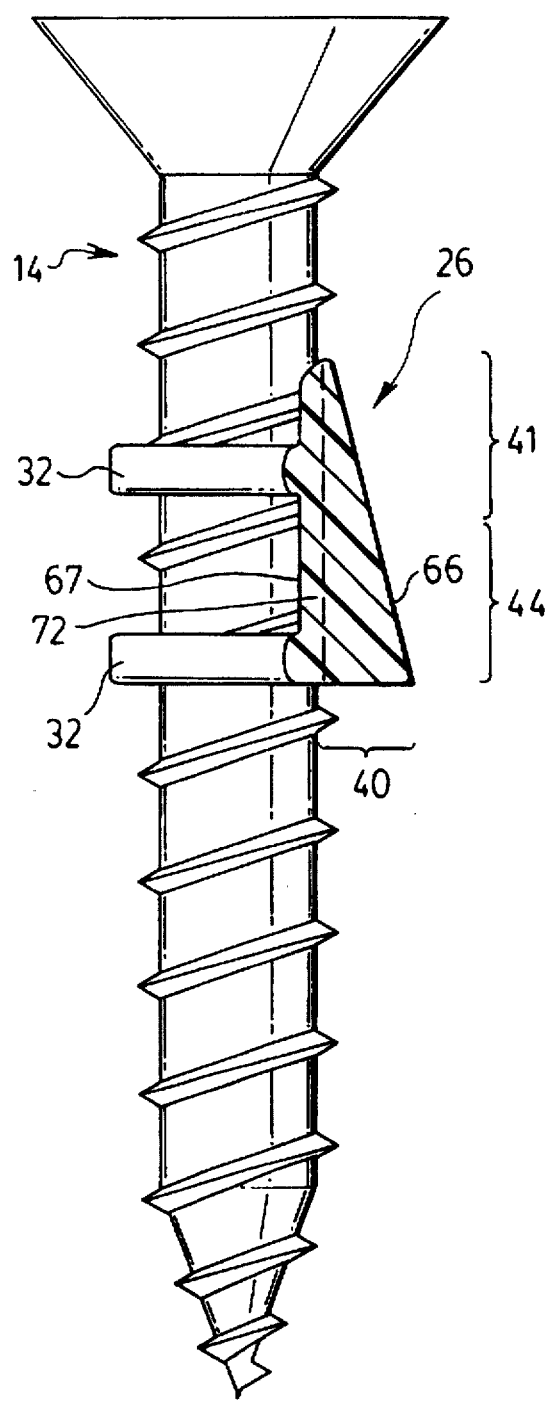

Reference is made to FIGS. 13, 14 and 15 which each show a separate embodiment of a screwstrip as illustrated in cross-sectional end view between two screws in a holding strip. In FIG. 13, the beam member 26 and its beam segment 40 each has a generally T-shape with the uppermost portion 40 and lowermost portion 42 being of similar rectangular shape and the enlarged reinforcing central portion 44, also being of generally rectangular shape but greater with.

FIG. 14 shows the beam member 26 and its beam segment 40 each as of a generally L-shape with an uppermost portion 41 and an enlarged reinforcing portion 44 both being generally rectangular but with the reinforcing portion having a greater width.

FIG. 15 shows the beam member 26 and its beam segment 40 each as of a generally triangular shape in cross-section with an uppermost portion 41 of reduced width compared to a reinforcing portion closer to the tip of increasing width. The embodiment of FIGS. 13 to 15 are but further examples of beam members 26 and their beam segments 40 with substantially constant cross-sectional shape and size throughout the length of the strip and with an enlarged width reinforcing portion 44 spaced from the head from an uppermost portion 40 of lesser width. Each of FIGS. 13 to 15 show beam members including both an outboard beam segment 40 and an inboard beam segment 72.

Figure 16:
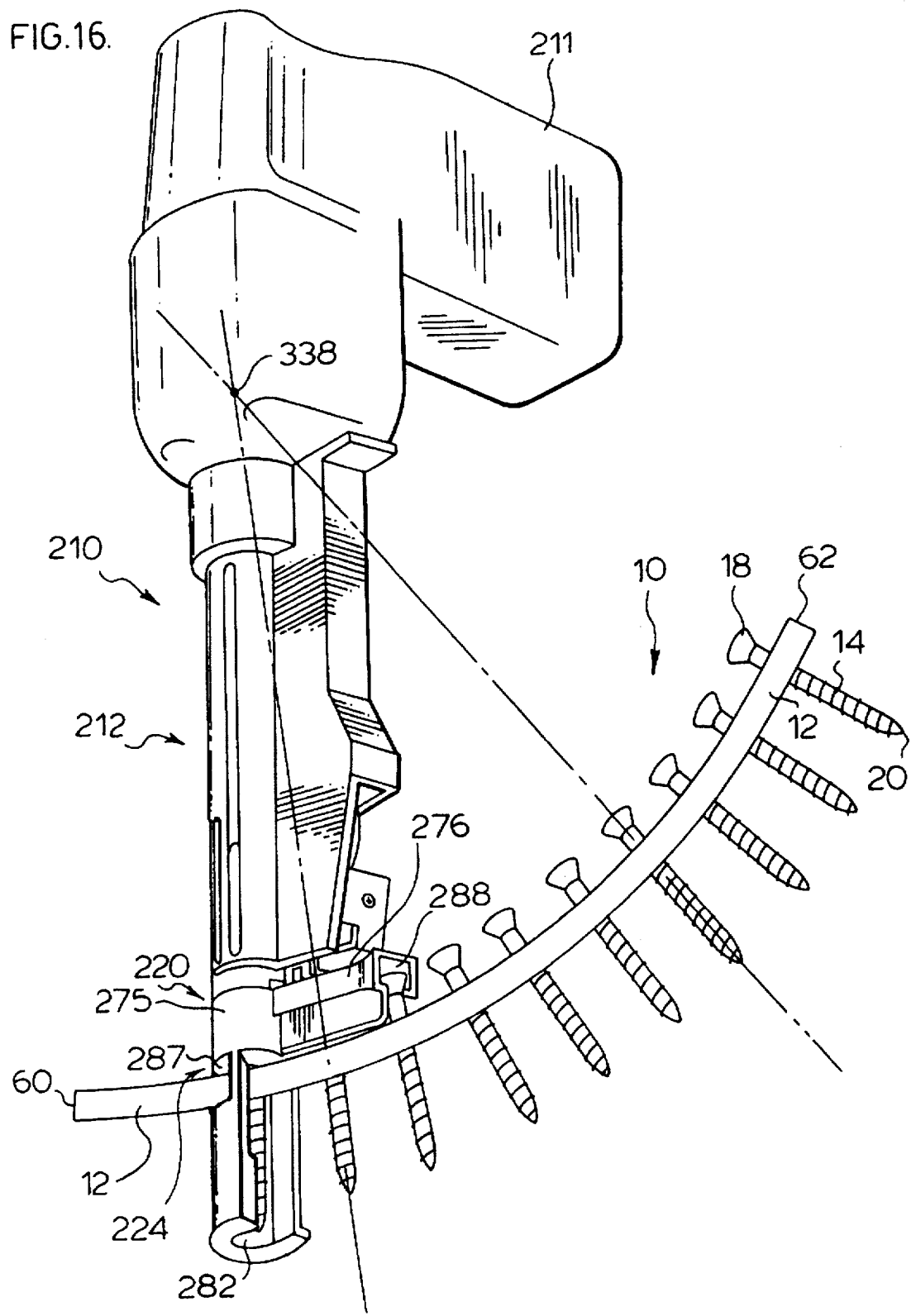
FIG. 16 is a pictorial view of a powerdriver attachment coupled to a screwgun adapted for driving a screwstrip in accordance with this invention and in which the screwstrip has a curved configuration.

Reference is made to FIG. 16 which shows a driver attachment 210 for driving collated screws similar to that taught by the applicant's U.S. Pat. No. 5,568,753, issued Oct. 29, 1996. The driver attachment 210 comprises a housing 212 secured to a power screwgun 211 and a slide body 220 reciprocally slidable relative the housing 212. The slide body 220 includes a nose portion 224 which comprises a guide tube 275 and a feed channel element 276 extending radially from the guide tube 275 such that screws in a screwstrip are advanced via the feed channel element 276 into a guideway 282 extending through the guide tube 275 in which they are axially aligned with a driver shaft (not shown) to drive successive screws. The guide tube 275 has an exit opening 287 through which the spent strip from which screws have been driven exits the guideway.

In FIG. 16, the screwstrip 10 is curved in the sense that the heads 18 of the screws 14 lie in a curved line at a constant radius from a point 338, preferably with, as shown, all of the axes of the screws lying in the same flat plane. Each screw 14 preferably extends radially from point 338, that is, with the axis of each screw disposed to extend as a radius through center point 338. In this configuration, the head 18 of the screws lie in one arc segment of a circle centered on point 338 and the tips 20 of the screws lie in another arc segment of a circle of greater radius centered on point 338. Similarly, the holding strip 12 is curved to conform to an arc segment of a circle centered on point 338.

The advantage of the curved discrete screwstrip 10 of FIG. 16 is that the tips of screws 16 which are yet to be driven are spaced further rearward from a workpiece than tips of screws which are all in a straight line. Having the tips of screws 14 spaced from the workpiece can be of assistance in preventing the tips of the screws not yet driven from marking the surface of a workpiece.

A preferred radius of curvature may be in the range of twelve to thirty-six inches, more preferably, eighteen to twenty-four inches. Preferably, the radius of curvature is in the range of about 18 to 24 inches for screwstrips of about 6 to 24 inches in length. Depending upon the curvature of the screwstrip 10, the screw feed channel element 276 and its channelway 288 may be adapted to adopt a similar radius of curvature although this is not necessary. It is preferred that the screwstrip be curved as to form an arc of a circle about a center point, however, this is not necessary. Having the screwstrip curved in a constant manner over its length is advantageous to assist in consistent feeding of the screwstrip through the guideway 276 and/or in adoption of a configuration of the guideway 276 to be customized for the screwstrip. However, providing the screwstrip with at least some curvature over some portion of its length is advantageous such that the curvature may at least partially offset the tendency of the screwstrip to droop when supported in cantilever fashion from its leading end. As the weight of the screws to be supported in cantilevered fashion will reduce as successive screws are driven, one preferred configuration is with a compound curve, the radius of curvature smallest proximate the leading end 60 of a screwstrip and increasing towards the terminal end 62. As with the curved screwstrip shown in FIG. 16, with a compound curve the heads of the screws would lie in a first curve in the central plane and the tips would lie in a corresponding second curve of greater radii. Preferably, having regard to the size and weight of the fasteners, the beam member is sized such that the beam member, if held in a cantilevered fashion by one or more screws at one end as in a driver attachment as shown, provides sufficient strength to support the entire remaining length of the beam member with the fasteners disposed therein when the common plane is vertical without substantial deflection of the beam member, preferably without deflection beyond that which would unbend the curve to be straight, that is, to place the heads of the screws in a straight line in the common plane.

FIG. 16 illustrates the holding strip 12 without showing specific details as to the configuration or cross-sectional shape of the holding strip. A preferred configuration and cross-sectional shape for the holding strip is as disclosed in the other embodiments such as shown in FIGS. 1 to 15, however, this is not necessary and the curved screwstrip of FIG. 16, in accordance with the present invention, may have many other configurations and cross-sectional shapes including those of previously known screwstrips and, particularly, those in which the holding strip 12 extends, as a web, axially relative the screws and between screws. The holding strip is preferably sufficiently self-supporting to maintain the screwstrip in a configuration that with the driver attachment vertical and the screwstrip extending sideways, the screwstrip does not droop downward below the tip of the screw being driven. A cross-sectional shape for the holding strip, such as shown in FIGS. 1, 9, 13, 14 or 15, is particularly preferred such that the beam member comprising the holding strip support the screws in the desired curved configuration.

Preferred configurations for the holding strips are configurations in which the strip has spaced sleeves with one screw received in each sleeve with the head of the screw extending from one rear end of the sleeve and the tip of the screw extending from the other forward end of the sleeve; with the sleeve threadably engaging the threads on the shank of the screw; and with each sleeve having a reduced strength portion such that a screw on being threaded tip first into a workpiece is automatically separated from its sleeve while maintaining the length of the strip substantially intact and while guiding the fastener by threaded engagement of the fastener in its respective sleeve. It is not, however, necessary that the strip remain intact and strips holding fasteners in which the holding strip is severed on removal of a fastener can also be advantageously provided to have a curved configuration as in FIG. 16 in accordance with the invention.

While the curved screwstrip 10 is shown in FIG. 16 as carrying threaded screws, it is to be appreciated that the fasteners need not be threaded fasteners and could comprise other fasteners such as nails, rivets, pins and the like.

The holding strip is preferably made of plastic material in FIG. 16 and in all the other embodiments, however, this is not necessary and particularly in the context of a curved strip as shown in FIG. 16, the holding strip could comprise other materials than plastic such as paper, cardboard, paper fiber, wire, metal, composites of all of these and the like.

It is preferred that the curved screwstrip 10, shown in FIG. 16, have all the screws lie in a common plane which is flat. However, the common plane may be curved as, for example, with the common plane being part of a surface of a cone member.

Figure 17:
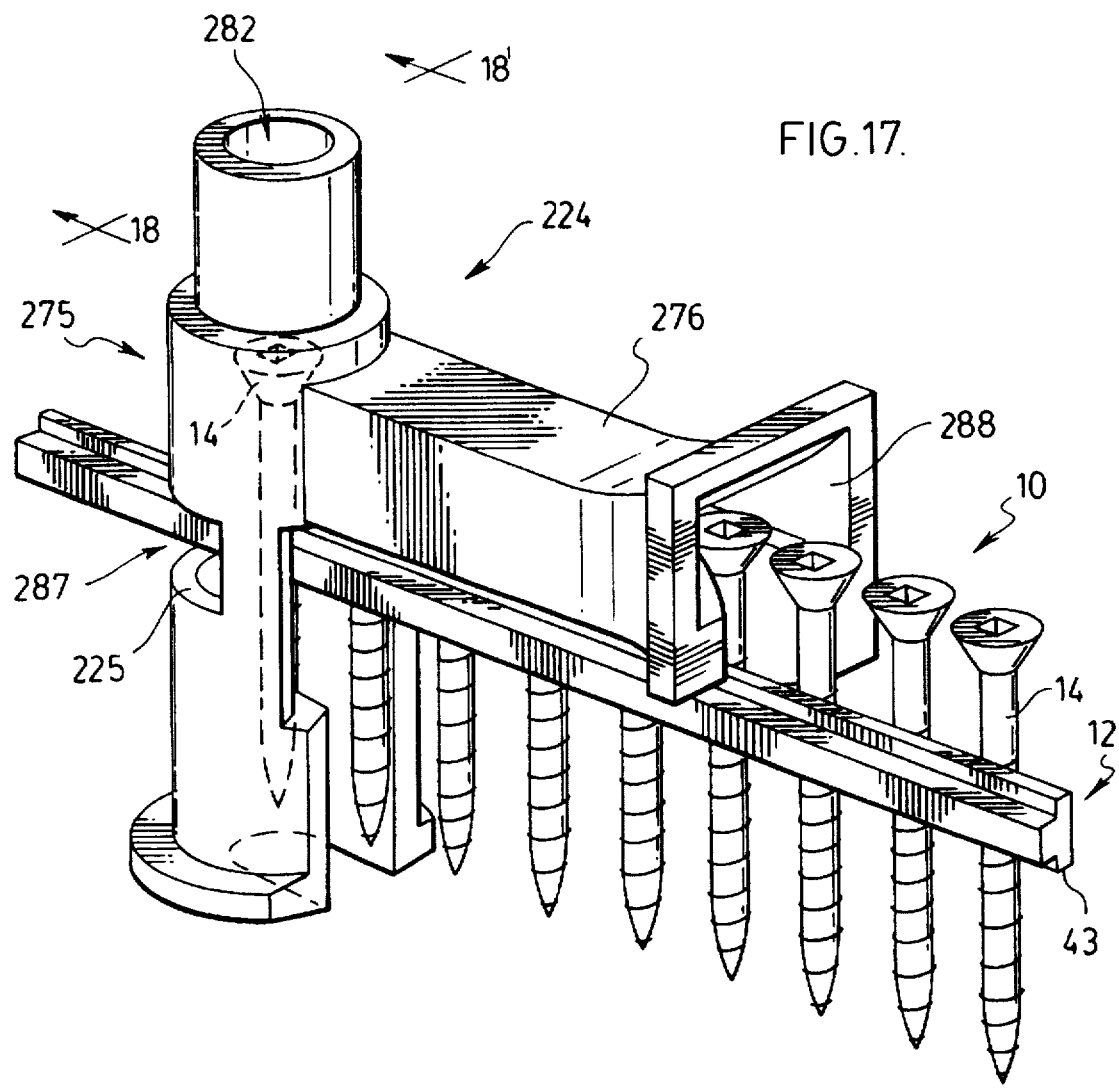
FIG. 17 is an enlarged pictorial view of a nose portion of the screwdriver attachment of FIG. 16 but with a straight screwstrip in accordance with the present invention.
Figure 18:
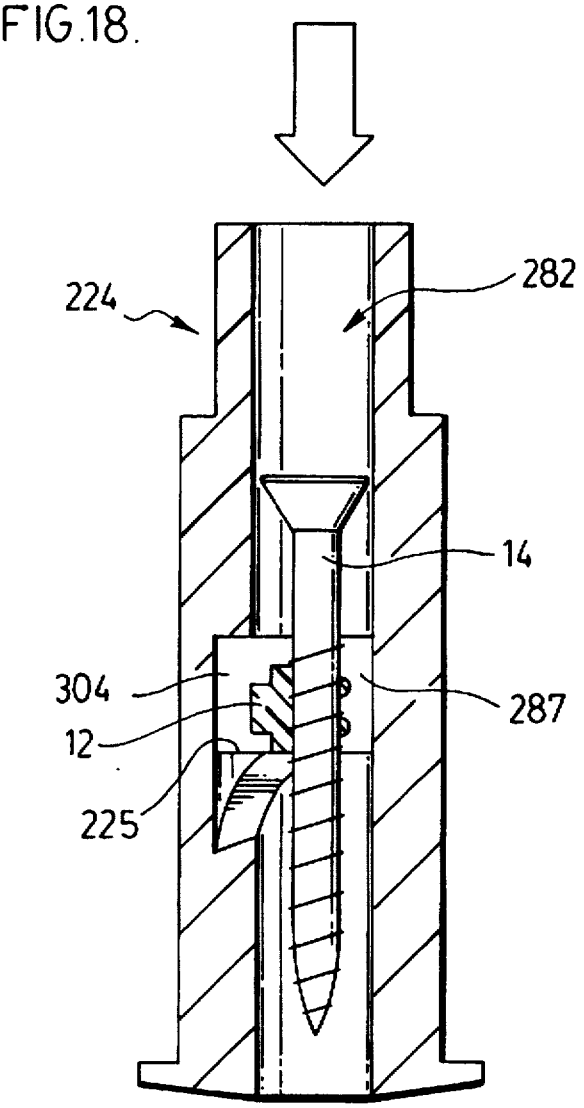
FIG. 18 is a cross-sectional view through the nose portion of FIG. 17 along section line 17-17'.

Reference is made to FIGS. 17 and 18 which show enlarged views of a nose portion 224 of a driver attachment as shown in FIG. 16, however, with a screwstrip 10 which is straight and has a cross-section substantially the same as shown in FIG. 15. As seen in FIG. 17, the screwstrip 10 is advanced via the feed channel element 276 into a guideway 282 extending through guide tube 275 with the spent holding strip exiting from exit opening 287. The exit opening 287 has a rearwardly directed surface 225 adapted to engage the forwardly directed support surface 43 of the holding strip 12 on the exit side of a screw being driven to assist in alignment of a screw to be driven by a bit carrying driver shaft (not shown) to be advanced into the guideway and drive a screw in the direction of the arrow shown in FIG. 18. In the context of screwstrips 10 which are to be supported by engagement of the strip supporting surface 43, it is advantageous that the lowermost portion 42 of the beam member 26 is of a lesser width than the reinforcing portion 44. The provision of the lowermost portion 42 with a lesser width than the reinforcing portion 44 assists the beam member 26 to twist and to deflect laterally to the left as seen in FIG. 18 into a lateral slotway 304 forming part of the exitway and out of the way of the head 18 of a screw as the screw is driven down through the guideway. As contrasted with a beam of a more rectangular cross-section, the provision of the lesser width lowermost portion 42 assists in initiation of twisting of the beam and lateral deflection. With the lowermost portion of the beam having increased flexibility, there is a reduced tendency of the holding strip to become jammed between the head 18 and the surface 225.

The embodiments shown have two straps 32. This is not necessary. Only a single strap 32 need be provided. The straps 32 as shown are but a preferred form of a fragile strap member which serves a purpose of securing a screw to the beam member 26 for release of the screw as described with reference to FIG. 9. The strap member need not be continuous and could be split or comprise a sleeve or split sleeve as in the manner of that described in Canadian Patent 1,040,600 to Keusch et al, issued Oct. 17, 1978. The strap member is merely a portion of the holding strip which retains the screw with less resistance to release of the screw than the remainder of the holding strip.

The complete screwstrip 10 of FIG. 1 is shown as comprising 12 screws. Screwstrips may be of different lengths as may be convenient. Preferably, screwstrips may be in the range of about 6 inches to 20 inches in length, more preferably about 12 inches. For many typically sized screws including drywall type screws advantageous spacing between screw centers is about ⅜ inch and therefore a 12 inches strip may hold about 33 screws. FIG. 1 shows the screwstrip as having its terminal ends 60 and 62 disposed about one half the distance between screws away from the last screw. Either or both of the terminal ends may extend beyond the last screw a greater distance to assist in initial advance into a power drive or to assist in a power driver driving the last screw. For example, a screwstrip could be provided for use with each of the screws nearest the ends 60 and 62 removed.

Figure 19:
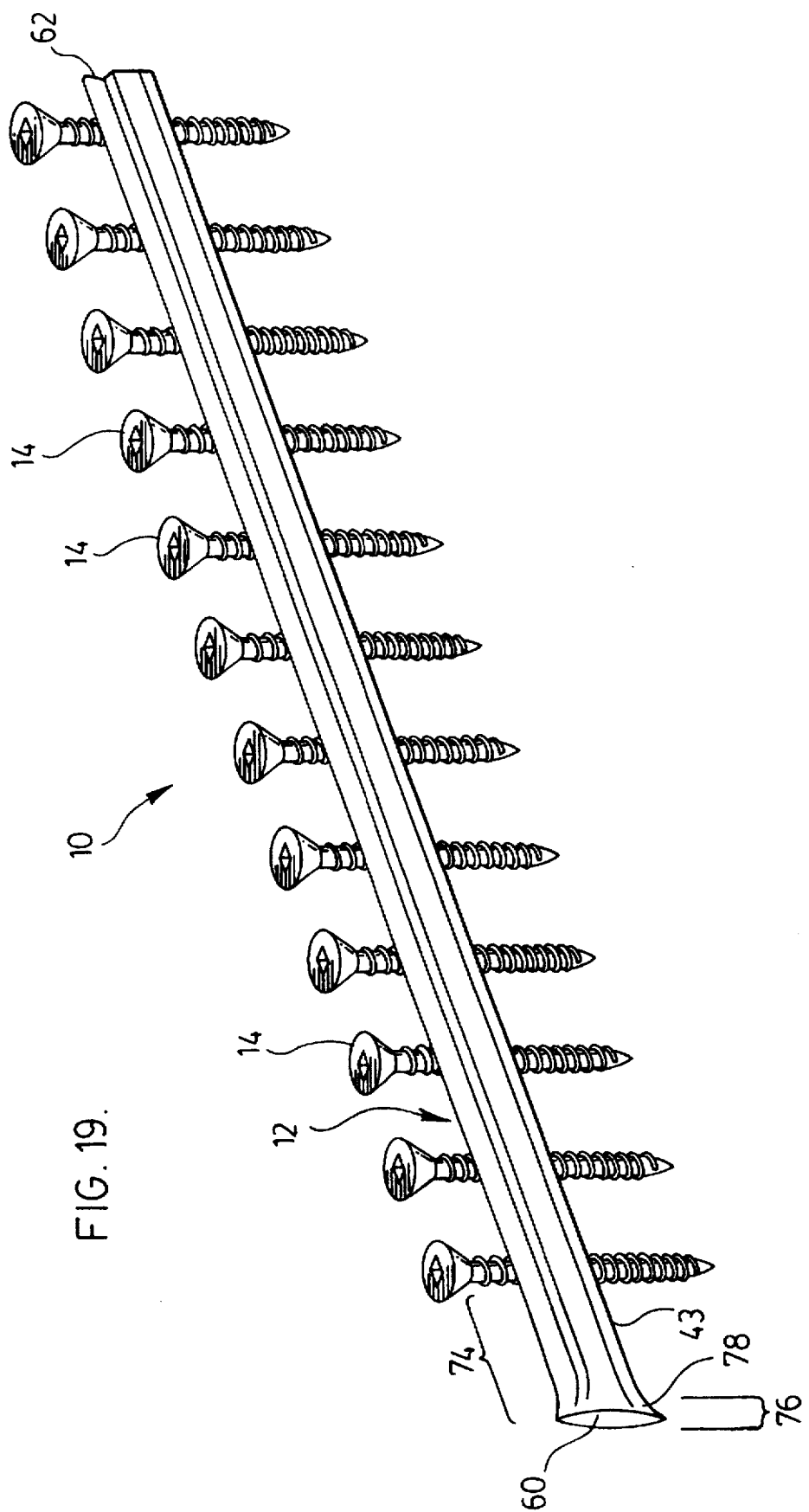
FIG. 19 is a pictorial view of a modified form of the screwstrip shown in FIG. 1.

In this regard, reference is made to FIG. 19 which shows a screwstrip 10 identical to that in FIG. 1 but modified merely at its entry end 60. In FIG. 19, the holding strip 12 extends as a guide section 74 to the left as seen, a distance from the end screw 14 about one and one half times the spacing between screws to entry end 60. The guide section 74 provides an extension which assists in initial loading of the screwstrip into many driver attachments and assists in locating the first screw to be driven within the driver attachment.

In the context of drivers which provide an exit opening, such as 287 in FIG. 17, from a nose portion through which the spent holding strip is to exit, the guide section 74 advantageously, on initial loading of the screwstrip, is long enough to extend out through the exit opening and ensure that in subsequent advance, the spent strip properly exits the nose portion. In the context of drivers which support the screwstrip by engaging the lowermost strip supporting surface 43 on the exit side of a screw to be driven, the guide section 74 provides this surface 43 on the exit side of the first screw at a sufficient distance to the left as shown to be engaged by a rearwardly directed surface of a driver, such as, for example, surface 225 in FIG. 17.

The guide section 74 of FIG. 19 has an end portion 76 which is of a different cross-section than the remainder of the holding strip 12. The end portion is advantageously formed, as by cutting the holding strip 12, so as to deform its cross-section and notably provide a forwardly directed prong 78 which extends forwardly beyond the surface 43. This prong 78 is disposed to the left exit side of the first screw a distance that, in the context of a driver attachment with a nose portion as shown in FIG. 17, the prong 78 is outside of surface 225 and assists by engagement on the outside of the nose portion in preventing the screwstrip 10 being withdrawn from the nose portion after initial insertion.

The embodiments shown illustrate the common plane 17 as being a flat planar plane. The common plane 17 need not be flat and could for example be linear in direction parallel the screws, and curve when seen in a cross-section normal the screws.

The embodiments shown show a typical wood screw as but an illustrative threaded fastener. Many other threaded fasteners may be utilized including fasteners with or without washers and fasteners for driving with sockets and other tools.

The invention has been described with reference to preferred embodiments. Many modifications and variations will now occur to persons skilled in the art. For a definition of the invention, reference is made to the appended claims.

We claim:

1. A collated screwstrip comprising a plastic holding strip and a plurality of threaded fasteners;

each fastener disposed about an axis and having a head at an upper end, a tip extending from the other lower end and a shank extending from below the head to the tip about the axis, threads about the shank, the holding strip holding the fasteners in a row in spaced side-by-side relation with the axis of the fasteners in a common plane;

the holding strip comprising an elongate beam member on one, outboard side of the common plane and with, for each fastener, at least one fragile strap member bridging the beam member across the shank of its respective fastener and passing on the other inboard side of the common plane to retain the fastener on the beam member, the beam member including an uppermost portion closest the head of the fastener and an enlarged reinforcing portion closer to the tip than the uppermost portion;

an outboardmost surface of the beam member having substantially the same profile in any cross-section normal the common plane throughout the length of the beam member;

in any cross-section normal the common plane the reinforcing portion having a width normal the common plane greater than a width of the uppermost portion normal the common plane such that the outboardmost surface of the beam member on the reinforcing portion extends farther outboard from the common plane than outboardmost surface of the beam member on the uppermost portion.

2. A screwstrip as claimed in claim 1 wherein in any cross-section normal the common plane the beam member having an outboardmost beam segment extending from said profile towards the common plane, which beam segment is of substantially identical shape and size throughout the length of the beam member.

3. A screwstrip as claimed in claim 2 wherein the identical shape and size of the beam segment throughout the length of the beam member is the same shape and size as a cross-section through the beam member normal the common plane through an axis of a fastener outboard of the shank.

4. A screwstrip as claimed in claim 1 wherein the beam member throughout the length of the beam member outboard of a plane parallel the common plane and passing immediately outboard of each of the fastener having a cross-section normal the common plane of substantially constant size and shape.

5. A screwstrip as claimed in claim 3 wherein the beam member further includes a lowermost portion closer to the tip than the reinforcing portion, in any cross-section normal the common plane the reinforcing portion having a width normal the common plane greater than a width of the lowermost portion normal the common plane such that the outboardmost surface of the beam member on the reinforcing portion extends farther outboard from the common plane than outboardmost surface of the beam member on the lowermost portion.

6. A screwstrip as claimed in claim 5 wherein the reinforcing portion having a height measured parallel the axis of the fasteners which is greater than a height of either of the uppermost portion or the lowermost portion measured parallel the axis of the fasteners.

7. A screwstrip as claimed in claim 6 wherein the beam segment has a height measured parallel the axis of the fasteners greater than its width measured normal the common plane.

8. A screwstrip as claimed in claim 7 wherein the height of the beam segment is at least about twice its width.

9. A screwstrip as claimed in claim 8 wherein the height of the reinforcing portion is about one half of the height of the beam segment.

10. A screwstrip as claimed in claim 9 wherein the height of the uppermost portion is greater than the height of the lowermost portion.

11. A screwstrip as claimed in claim 5 wherein the beam segment has a substantially T-shape in cross-section normal the central plane.

12. A screwstrip as claimed in claim 5 wherein the reinforcing portion extends outboard substantially a constant distance from the common plane measured parallel the axis of the fasteners to present the outboardmost surface over the reinforcing portion generally in a first outboard plane.

13. A screwstrip as claimed in claim 12 wherein the uppermost portion and lowermost portions both extend outboard substantially the same constant distance from the common plane throughout their height measured parallel the axis of the fasteners.

14. A screwstrip as claimed in claim 1 wherein the uppermost portion has an inboard camming surface facing the common plane, the camming surface angled to extend upwardly and away from the shank of the fastener for engagement with an undersurface of the head of the fastener to assist in deflecting the fastener relative the holding strip away from the beam member in a direction perpendicular the common plane on the fastener being threaded axially downwardly relative the beam member.

15. A screwstrip as claimed in claim 14 wherein the camming surfaces comprise bevelled uppermost inboard top surfaces of the uppermost portion extending continuously the entire length of the beam member.

16. A screwstrip as claimed in claim 1 wherein the fasteners are held in the holding strip with the axis of the fasteners in parallel relation.

17. A screwstrip as claimed in claim 1 wherein the common plane is planar.

18. A screwstrip as claimed in claim 16 wherein the beam member comprises an elongate member of discrete length wherein, having regard to the size and weight of the fasteners, the beam member is sized such that the beam member, if held in a cantilevered fashion at one end, provides sufficient strength to support the entire length of the beam member with the fasteners disposed therein without substantial vertical deflection of the beam member when the common plane is vertical.

19. A screwstrip as claimed in claim 5 wherein two fragile strap members are provided for each screw comprising an upper strap member proximate the juncture between the uppermost portion and the reinforcing portion and a lower strap member proximate the juncture between the reinforcing portion and the lowermost portion.

20. A screwstrip as claimed in claim 1 wherein the beam member has a lowermost strip supporting surface disposed at a constant height from the head of each fastener.

21. A screwstrip as claimed in claim 3 wherein the reinforcing portion having a height measured parallel the axis of the fasteners which is greater than a height of the uppermost portion measured parallel the axis of the fasteners.

22. A screwstrip as claimed in claim 1 wherein threads of the threaded shank engaging in corresponding thread grooves formed in an inboard surface of the beam member.

23. A screwstrip as claimed in claim 1 wherein at least a portion of the holding strip holds the fasteners in a generally curved configuration wherein the heads of the screws lie on a first curve in the common plane and the tips of the screws lie on a second curve in the common plane, wherein at each fastener in the portion a radius of curvature of the first curve is less than a radius of curvature of the second curve.

24. In combination, a holding strip and a plurality of fasteners,
- each fastener disposed about an axis and having a head and an upper end, a tip extending from the other end and a shank extending from below the head to the tip about the axis,
- the holding strip holding the fasteners in a row spaced side-by-side relation with the axis of the fasteners in a common plane,
- the holding strip comprises an elongate beam member which extends axially relative the fasteners and longitudinally between fasteners,
- at least a portion of the holding strip holding the fasteners in a generally curved configuration wherein the heads of the fasteners lie on a first curve in the common plane and the tips of the fasteners lie in a corresponding second curve in the common plane of greater radii.

25. A combination as claimed in claim 24, wherein the fasteners are disposed a constant distance from a center point in said common plane with the axis of each fastener extending through the center point.

26. A combination as claimed in claim 25 wherein,
- the fasteners comprise threaded fasteners with threads about the shank,
- the beam member carrying spaced sleeves with one of the fasteners received in each sleeve,
- each fastener received in each sleeve spaced a uniform distance from adjacent fasteners with the fastener's head extending from one rear end of the sleeve and the fastener's tip extending from the other forward end of the sleeve,
- the sleeve threadably engaging the threads on the shank,
- the sleeve having a reduced strength portion such that a fastener on being threaded tip first into a workpiece is automatically separated from its sleeve while maintaining the length of the strip substantially intact and while guiding the fastener by threaded engagement of the fastener in its respective sleeve.

27. A combination as claimed in claim 24 wherein the beam member comprises an elongate member of discrete length wherein, having regard to the size and weight of the fasteners, the beam member is sized such that the beam member, if held in a cantilevered fashion at one end, provides sufficient strength to support the entire length of the beam member with the fastener disposed therein when the common plane is vertical without deflection of the beam member sufficiently beyond deflection necessary to place the heads of the fasteners in a straight line in the common plane.

* * * * *